United States Patent
Zhou et al.

(10) Patent No.: US 10,938,489 B2
(45) Date of Patent: Mar. 2, 2021

(54) APPARATUS AND METHOD FOR CORRECTING DEVIATION BETWEEN PLURALITY OF TRANSMISSION CHANNELS

(71) Applicant: HUAWEI TECHNOLOGIES CO., LTD., Guangdong (CN)

(72) Inventors: Mu Zhou, Shanghai (CN); Yi Cao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/911,925

(22) Filed: Jun. 25, 2020

(65) Prior Publication Data
US 2020/0328828 A1    Oct. 15, 2020

Related U.S. Application Data

(63) Continuation of application No. PCT/CN2017/120207, filed on Dec. 29, 2017.

(51) Int. Cl.
*H04B 17/11* (2015.01)
*H04B 7/06* (2006.01)

(52) U.S. Cl.
CPC .............. *H04B 17/11* (2015.01); *H04B 7/06* (2013.01)

(58) Field of Classification Search
CPC ...... H04B 17/11; H04B 7/06; H04B 17/0082; H04B 17/0085; H04B 17/0087; H04B 17/12
See application file for complete search history.

(56) References Cited

U.S. PATENT DOCUMENTS 9,154,969 B1 * 10/2015 Srinivasa ............... H04B 17/14
9,717,008 B1 *  7/2017 Sharma ................. H04W 24/06
(Continued)

FOREIGN PATENT DOCUMENTS

CN    101335966 A    12/2008
CN    101964449 A     2/2011
(Continued)

OTHER PUBLICATIONS

Extended European Search Report issued in European Application No. 17936342.9 dated Sep. 17, 2020, 5 pages.
(Continued)

*Primary Examiner* — Sophia Vlahos
(74) *Attorney, Agent, or Firm* — Fish & Richardson P.C.

(57) ABSTRACT

The present disclosure relates to apparatus for correcting a deviation between a plurality of transmission channels, which includes a first transmission channel and a second transmission channel. The first transmission channel and the second transmission channel are respectively connected to a first endpoint and a second endpoint of a correction coupling channel. One example apparatus includes a receiver and at least one processor. The receiver is configured to when a first signal is fed at the first endpoint and a second signal is fed at the second endpoint, respectively detect a plurality of signal vectors based on a plurality of feedback signals of the first transmission channel and the second transmission channel. The at least one processor is configured to determine a deviation correction value between the first transmission channel and the second transmission channel based on the detected signal vectors.

15 Claims, 10 Drawing Sheets

(56) References Cited

U.S. PATENT DOCUMENTS

| | | | | |
|---|---|---|---|---|
| 2008/0198066 | A1* | 8/2008 | Kang | H04L 27/2601 |
| | | | | 342/174 |
| 2010/0087227 | A1* | 4/2010 | Francos | H03F 1/3247 |
| | | | | 455/562.1 |
| 2013/0259107 | A1 | 10/2013 | Moon et al. | |
| 2018/0288723 | A1* | 10/2018 | Cai | H04J 13/18 |

FOREIGN PATENT DOCUMENTS

| | | |
|---|---|---|
| CN | 103828270 A | 5/2014 |
| EP | 1775854 A1 | 4/2007 |
| WO | 2012103856 A2 | 8/2012 |
| WO | 2016202258 A1 | 12/2016 |

OTHER PUBLICATIONS

PCT International Search Report and Written Opinion issued in International Application No. PCT/CN2017/120207 dated Sep. 21, 2018, 16 pages (with English translation).

Shi Xiaobin et al., "On-line monitoring and correction of channel amplitude and phase error for phased array radar based on phase interleaving," Journal of Nanjing University of Science and Technology, vol. 38 No. 5, Oct. 2014, 8 pages (with English abstract).

* cited by examiner (a) TRX module for transmitting and receiving an independent PS (b) TRX module for transmitting and receiving a shared PS

APPARATUS AND METHOD FOR CORRECTING DEVIATION BETWEEN PLURALITY OF TRANSMISSION CHANNELS

CROSS-REFERENCE TO RELATED APPLICATIONS

This application is a continuation of International Application No. PCT/CN2017/120207, filed on Dec. 29, 2017, the disclosure of which is hereby incorporated by reference in its entirety.

TECHNICAL FIELD

This application relates to the field of communications technologies, and in particular, to an apparatus and a method for correcting a deviation between a plurality of transmission channels.

BACKGROUND

A phased array is a phase-controlled electronically scanned array, and is formed by arranging a large quantity of antenna units into an array. Each antenna unit may be controlled by an independent switch, and a radiation direction of an electromagnetic wave is modulated by controlling an amplitude and a phase of the antenna unit in the array, to synthesize a directional scanning-focused beam.

In a 5G communications system, a millimeter wave is used as a carrier of a signal. Because attenuation of the millimeter wave propagated in the atmosphere is greatly increased compared with that of a low-frequency electromagnetic wave, by introducing a large phased array technology, directionality and equivalent omnidirectional radiation power of the signal in the 5G communications system may be enhanced, and a system communication distance and a system capacity are increased. In the large phased array technology, a large quantity of signal transmission channels integrated into one or more chips are used. A high-performance phased array requires highly consistent channels. However, in a production and use process, a deviation is generated between the transmission channels, and the deviation between the channels needs to be corrected.

Currently, when channels in a chip are corrected, a signal generator and a quadrature receiver are usually disposed inside the chip. A reference signal is generated by using the signal generator, and is fed into the transmission channels by using one end of a transmission line of the reference signal. Then output signals of the transmission channels and the reference signal generated by the signal generator are input into the quadrature receiver, so that a phase of each transmission channel is obtained. An estimated transmission delay caused by the transmission line is subtracted from a difference between phases of two transmission channels, to obtain a final phase correction value between the transmission channels. However, a deviation is also generated during production and use of the transmission line. Accuracy of the transmission delay that is caused by the transmission line and that is determined through estimation is relatively low. Consequently, an obtained phase correction value corresponding to each transmission channel has a relatively large error, and further, correction accuracy of the transmission channels is relatively low.

SUMMARY

Embodiments of this application provide an apparatus and a method for correcting a deviation between a plurality of transmission channels, to improve correction accuracy of a deviation between transmission channels.

To achieve the foregoing objectives, the following technical solutions are used in the embodiments of this application.

According to a first aspect, an apparatus for correcting a deviation between a plurality of transmission channels is provided. The plurality of transmission channels include a first transmission channel, a second transmission channel, and a correction coupling channel. A first endpoint of the correction coupling channel is connected to the first transmission channel. A second endpoint of the correction coupling channel is connected to the second transmission channel. The apparatus includes: a vector detection unit, configured to: when a first signal is fed at the first endpoint, detect a first signal vector based on a first feedback signal of the first transmission channel, and detect a second signal vector based on a second feedback signal of the second transmission channel, where the vector detection unit is further configured to: when a second signal is fed at the second endpoint, detect a third signal vector based on a third feedback signal of the first transmission channel, and detect a fourth signal vector based on a fourth feedback signal of the second transmission channel, where the second feedback signal and the third feedback signal are propagated in opposite directions on the correction coupling channel; and a processing unit, configured to determine a deviation correction value between the first transmission channel and the second transmission channel based on the detected signal vectors, where the deviation correction value is used to correct a deviation between the first transmission channel and the second transmission channel.

In the foregoing technical solution, when the first transmission channel and the second transmission channel are receive channels, and the first signal is fed at the first endpoint and the second signal is fed at the second endpoint, the plurality of signal vectors are respectively detected based on the plurality of feedback signals of the first transmission channel and the second transmission channel. The second feedback signal and the third feedback signal are propagated in opposite directions between the first endpoint and the second endpoint of the correction coupling channel. Therefore, the deviation correction value between the first transmission channel and the second transmission channel may be determined based on the detected signal vectors of the feedback signals, so that transmission deviation values of the correction coupling channel are offset. Further, when correction is performed based on the deviation correction value, correction accuracy of the receive channels can be improved.

In a first possible implementation of the first aspect, the second feedback signal is a signal obtained after the first signal is propagated through the correction coupling channel from the first endpoint to the second endpoint and the second transmission channel, and the third feedback signal is a signal obtained after the second signal is propagated through the first transmission channel and the correction coupling channel from the second endpoint to the first endpoint.

In the first possible implementation of the first aspect, the vector detection unit includes a quadrature receiver, the first transmission channel and the second transmission channel are combined by using a combiner, and the quadrature receiver is connected to the combiner by using a coupler; when the first signal is fed at the first endpoint, the quadrature receiver separately performs frequency mixing processing on the first signal and the first feedback signal and on the first signal and the second feedback signal, to obtain the first signal vector and the second signal vector; and when the second signal is fed at the second endpoint, the quadrature receiver separately performs frequency mixing processing on the second signal and the third feedback signal and on the second signal and the fourth feedback signal, to obtain the third signal vector and the fourth signal vector. In the foregoing possible implementation, the quadrature receiver separately performs frequency mixing processing on the first signal fed at the first endpoint and the first feedback signal and on the first signal fed at the first endpoint and the second feedback signal, and separately performs frequency mixing processing on the second signal fed at the second endpoint and the third feedback signal and on the second signal fed at the second endpoint and the fourth feedback signal, so that the signal vectors of the plurality of feedback signals can be quickly and effectively obtained, and efficiency of signal vector detection is improved.

In the first possible implementation of the first aspect, the apparatus further includes a splitter, the splitter is connected to the quadrature receiver, and the splitter is further connected to the first endpoint and the second endpoint of the correction coupling channel by using a switching unit, where when the splitter is connected to the first endpoint by using the switching unit, the splitter is configured to split the first signal to the quadrature receiver and the first endpoint, and when the splitter is connected to the second endpoint by using the switching unit, the splitter is configured to split the second signal to the quadrature receiver and the second endpoint. Optionally, the switching unit is a three-port switch or a three-port balun. In the foregoing possible implementation, the splitter and the switching unit may be used to split the first signal to the quadrature receiver and the first endpoint, and split the second signal to the quadrature receiver and the second endpoint, so that complexity of the apparatus can be reduced to some extent.

In the first possible implementation of the first aspect, the apparatus is an apparatus into which a radio frequency signal is input, and the first signal and the second signal are radio frequency signals, where the first signal and the second signal are radio frequency signals from the outside; or the apparatus further includes a signal generator connected to the splitter, where the signal generator is configured to generate radio frequency signals, and the radio frequency signals include the first signal and the second signal. In the foregoing possible implementation, the apparatus may be configured to correct a deviation between radio frequency transmission channels, to improve correction accuracy of the radio frequency transmission channels.

In the first possible implementation of the first aspect, the apparatus is an apparatus into which an intermediate frequency signal is input, the apparatus further includes a frequency mixer connected to the splitter, and the frequency mixer is configured to perform frequency mixing processing on the intermediate frequency signal and correction signals, to obtain the first signal and the second signal, where the correction signals are from the outside, or the apparatus further includes a signal generator, and the signal generator is configured to generate the correction signals. In the foregoing possible implementation, the apparatus may be configured to correct a deviation between intermediate-frequency-to-radio-frequency transmission channels, to improve correction accuracy of the intermediate-frequency-to-radio-frequency transmission channels.

In the first possible implementation of the first aspect, the apparatus is an apparatus into which a baseband signal is input, where the first signal and the second signal are from the outside, or the apparatus further includes a signal generator connected to the splitter, and the signal generator is configured to generate the first signal and the second signal. In the foregoing possible implementation, the apparatus may be configured to correct a deviation between baseband-to-radio-frequency transmission channels, to improve correction accuracy of the baseband-to-radio-frequency transmission channels.

In the first possible implementation of the first aspect, when the plurality of transmission channels further include a third transmission channel, the apparatus is further configured to: correct a deviation between the first transmission channel and the third transmission channel, and/or correct a deviation between the second transmission channel and the third transmission channel. In the foregoing possible implementation, a deviation between any two of the plurality of transmission channels can be corrected, and correction accuracy of the deviation between the plurality of transmission channels can be improved.

In a possible implementation of the first aspect, the apparatus may be integrated into a semiconductor chip, the plurality of transmission channels may also be integrated into a semiconductor chip, and the apparatus and the plurality of transmission channels may be integrated into a same semiconductor chip, or may be integrated into different semiconductor chips.

According to a second aspect, a wireless communications device is provided. The wireless communications device includes the apparatus according to any one of the first aspect or the possible implementations of the first aspect. Optionally, the device may be a base station, or may be a terminal.

According to a third aspect, a method for correcting a deviation between a plurality of transmission channels is provided. The plurality of transmission channels include a first transmission channel, a second transmission channel, and a correction coupling channel. A first endpoint of the correction coupling channel is connected to the first transmission channel. A second endpoint of the correction coupling channel is connected to the second transmission channel. The method includes: when a first signal is fed at the first endpoint, detecting a first signal vector based on a first feedback signal of the first transmission channel, and detecting a second signal vector based on a second feedback signal of the second transmission channel; when a second signal is fed at the second endpoint, detecting a third signal vector based on a third feedback signal of the first transmission channel, and detecting a fourth signal vector based on a fourth feedback signal of the second transmission channel, where the second feedback signal and the third feedback signal are propagated in opposite directions on the correction coupling channel; and determining a deviation correction value between the first transmission channel and the second transmission channel based on the detected signal vectors, where the deviation correction value is used to correct a deviation between the first transmission channel and the second transmission channel.

In a possible implementation of the third aspect, the second feedback signal is a signal obtained after the first signal is propagated through the correction coupling channel from the first endpoint to the second endpoint and the second transmission channel, and the third feedback signal is a signal obtained after the second signal is propagated through the first transmission channel and the correction coupling channel from the second endpoint to the first endpoint.

In a possible implementation of the third aspect, the detecting a first signal vector and detecting a second signal vector includes: separately performing frequency mixing processing on the first signal and the first feedback signal and on the first signal and the second feedback signal, to obtain the first signal vector and the second signal vector; and the detecting a third signal vector and detecting a fourth signal vector includes: separately performing frequency mixing processing on the second signal and the third feedback signal and on the second signal and the fourth feedback signal, to obtain the third signal vector and the fourth signal vector.

In a possible implementation of the third aspect, when the plurality of transmission channels further include a third transmission channel, the method further includes: correcting a deviation between the first transmission channel and the third transmission channel, and/or correcting a deviation between the second transmission channel and the third transmission channel.

The method according to any one of the third aspect or the possible implementations of the third aspect may be performed by the apparatus according to any one of the first aspect or the possible implementations of the first aspect or a chip, or may be performed by the wireless communications device according to the second aspect.

According to a fourth aspect, an apparatus for correcting a deviation between a plurality of transmission channels is provided. The plurality of transmission channels include a first transmission channel, a second transmission channel, and a correction coupling channel. A first endpoint of the correction coupling channel is connected to the first transmission channel. A second endpoint of the correction coupling channel is connected to the second transmission channel. The apparatus includes: a vector detection unit, configured to: when a first signal is input, detect a first signal vector based on a first feedback signal of the first transmission channel that is output from the first endpoint, and detect a second signal vector based on a second feedback signal of the second transmission channel that is output from the first endpoint, where the vector detection unit is further configured to: when a second signal is input, detect a third signal vector based on a third feedback signal of the first transmission channel that is output from the second endpoint, and detect a fourth signal vector based on a fourth feedback signal of the second transmission channel that is output from the second endpoint, where the second feedback signal and the third feedback signal are propagated in opposite directions on the correction coupling channel; and a processing unit, configured to determine a deviation correction value between the first transmission channel and the second transmission channel based on the detected signal vectors, where transmission deviation values of the correction coupling channel are offset by each other, and the deviation correction value is used to correct a deviation between the first transmission channel and the second transmission channel.

In the foregoing technical solution, when the first transmission channel and the second transmission channel are transmit channels, and the first signal and the second signal are separately input, the plurality of signal vectors are respectively detected based on the feedback signals of the first transmission channel and the second transmission channel that are output from the first endpoint and the second endpoint. The second feedback signal and the third feedback signal are propagated in the opposite directions on the correction coupling channel. Therefore, the deviation correction value between the first transmission channel and the second transmission channel may be determined based on the plurality of detected signal vectors, so that the transmission deviation values of the correction coupling channel are offset. Further, when correction is performed based on the deviation correction value, correction accuracy of receive channels can be improved.

In a possible implementation of the fourth aspect, the second feedback signal is a signal obtained after the first signal is propagated through the second transmission channel and the correction coupling channel from the second endpoint to the first endpoint, and the third feedback signal is a signal obtained after the second signal is propagated through the first transmission channel and the correction coupling channel from the first endpoint to the second endpoint.

In a possible implementation of the fourth aspect, the vector detection unit includes a quadrature receiver, and the quadrature receiver is connected to the first endpoint and the second endpoint of the correction coupling channel; when the first signal is input, the quadrature receiver separately performs frequency mixing processing on the first signal and the first feedback signal and on the first signal and the second feedback signal, to obtain the first signal vector and the second signal vector; and when the second signal is input, the quadrature receiver separately performs frequency mixing processing on the second signal and the third feedback signal and on the second signal and the fourth feedback signal, to obtain the third signal vector and the fourth signal vector. In the foregoing possible implementation, the quadrature receiver separately performs frequency mixing processing on the first signal and the first feedback signal and on the first signal and the second feedback signal, and separately performs frequency mixing processing on the second signal and the third feedback signal and on the second signal and the fourth feedback signal, so that the signal vectors of the plurality of feedback signals can be quickly and effectively obtained, and efficiency of signal vector detection can be improved.

In a possible implementation of the fourth aspect, the apparatus further includes a splitter, and the splitter is connected to the first transmission channel, the second transmission channel, and the quadrature receiver, to separately input the first signal and the second signal into the first transmission channel, the second transmission channel, and the quadrature receiver; and the quadrature receiver is further connected to the first endpoint and the second endpoint of the correction coupling channel by using a switching unit, where when the quadrature receiver is connected to the first endpoint by using the switching unit, the quadrature receiver receives the first feedback signal and the second feedback signal, and when the quadrature receiver is connected to the second endpoint by using the switching unit, the quadrature receiver receives the third feedback signal and the fourth feedback signal. Optionally, the switching unit is a three-port switch or a three-port balun. In the foregoing possible implementation, the splitter is used to separately split the first signal and the second signal to the first transmission channel, the second transmission channel, and the quadrature receiver by using the splitter, and the quadrature receiver separately receives, by using the switching unit, the feedback signals output from the first endpoint and the feedback signals output from the second endpoint, so that complexity of the apparatus can be reduced to some extent.

In a first possible implementation of the fourth aspect, the apparatus is an apparatus into which a radio frequency signal is input, and the first signal and the second signal are radio frequency signals; and the first signal and the second signal are radio frequency signals from the outside; or the apparatus further includes a signal generator connected to the splitter, where the signal generator is configured to generate radio frequency signals, and the radio frequency signals include the first signal and the second signal. In the foregoing possible implementation, the apparatus may be configured to correct a deviation between radio frequency transmission channels, to improve correction accuracy of the radio frequency transmission channels.

In the first possible implementation of the fourth aspect, the apparatus is an apparatus into which an intermediate frequency signal is input, the apparatus further includes a frequency mixer connected to the splitter, and the frequency mixer is configured to perform frequency mixing processing on the intermediate frequency signal and correction signals, to obtain the first signal and the second signal, where the correction signals are from the outside, or the apparatus further includes a signal generator, and the signal generator is configured to generate the correction signals. In the foregoing possible implementation, the apparatus may be configured to correct a deviation between intermediate-frequency-to-radio-frequency transmission channels, to improve correction accuracy of the intermediate-frequency-to-radio-frequency transmission channels.

In the first possible implementation of the fourth aspect, the apparatus is an apparatus into which a baseband signal is input, where the first signal and the second signal are from the outside; or the apparatus further includes a signal generator connected to the splitter, and the signal generator is configured to generate the first signal and the second signal. In the foregoing possible implementation, the apparatus may be configured to correct a deviation between baseband-to-radio-frequency transmission channels, to improve correction accuracy of the baseband-to-radio-frequency transmission channels.

In the first possible implementation of the fourth aspect, when the plurality of transmission channels further include a third transmission channel, the apparatus is further configured to: correct a deviation between the first transmission channel and the third transmission channel, and/or correct a deviation between the second transmission channel and the third transmission channel. In the foregoing possible implementation, a deviation between any two of the plurality of transmission channels can be corrected, and correction accuracy of the deviation between the plurality of transmission channels can be improved.

In a possible implementation of the fourth aspect, the apparatus may be integrated into a semiconductor chip, the plurality of transmission channels may also be integrated into a semiconductor chip, and the apparatus and the plurality of transmission channels may be integrated into a same semiconductor chip, or may be integrated into different semiconductor chips.

According to a fifth aspect, a wireless communications device is provided. The wireless communications device includes the apparatus according to any one of the first aspect or the possible implementations of the first aspect. Optionally, the device may be a base station, or may be a terminal.

According to a sixth aspect, a method for correcting a deviation between a plurality of transmission channels is provided. The plurality of transmission channels include a first transmission channel, a second transmission channel, and a correction coupling channel. A first endpoint of the correction coupling channel is connected to the first transmission channel. A second endpoint of the correction coupling channel is connected to the second transmission channel. The method includes: when a first signal is input, detecting a first signal vector based on a first feedback signal of the first transmission channel, and detecting a second signal vector based on a second feedback signal of the second transmission channel; when a second signal is input, detecting a third signal vector based on a third feedback signal of the first transmission channel, and detecting a fourth signal vector based on a fourth feedback signal of the second transmission channel, where the second feedback signal and the third feedback signal are propagated in opposite directions on the correction coupling channel; and determining a deviation correction value between the first transmission channel and the second transmission channel based on the detected signal vectors, where the deviation correction value is used to correct a deviation between the first transmission channel and the second transmission channel.

In a possible implementation of the sixth aspect, the second feedback signal is a signal obtained after the first signal is propagated through the second transmission channel and the correction coupling channel from the second endpoint to the first endpoint, and the third feedback signal is a signal obtained after the second signal is propagated through the first transmission channel and the correction coupling channel from the first endpoint to the second endpoint.

In a possible implementation of the sixth aspect, the detecting a first signal vector and detecting a second signal vector includes: separately performing frequency mixing processing on the first signal and the first feedback signal and on the first signal and the second feedback signal, to obtain the first signal vector and the second signal vector; and the detecting a third signal vector and detecting a fourth signal vector includes: separately performing frequency mixing processing on the second signal and the third feedback signal and on the second signal and the fourth feedback signal, to obtain the third signal vector and the fourth signal vector.

In a possible implementation of the sixth aspect, when the plurality of transmission channels further include a third transmission channel, the method further includes: correcting a deviation between the first transmission channel and the third transmission channel, and/or correcting a deviation between the second transmission channel and the third transmission channel.

The method according to any one of the sixth aspect or the possible implementations of the sixth aspect may be performed by the apparatus according to any one of the fourth aspect or the possible implementations of the fourth aspect or a chip, or may be performed by the wireless communications device according to the fifth aspect.

It should be noted that the vector detection unit in the foregoing aspects may be a unit configured to detect a signal amplitude and/or a signal phase, and a vector may include the signal amplitude and the signal phase. Optionally, the vector detection unit may output two component signals, and the two component signals may be used to determine the signal amplitude and the signal phase. For example, the vector detection unit may include a quadrature receiver or a Hilbert (Hilbert) filter, and the quadrature receiver or the Hilbert filter may be configured to output two component signals: I and Q, so that a signal amplitude A and a signal phase $\theta$ may be determined according to the following formula (a) and formula (b), or the quadrature receiver or the Hilbert filter may be directly configured to output the signal amplitude A and the signal phase $\theta$.

$$A = 10 \lg(I^2 + Q^2) \quad \text{(a)}$$

$$\theta = \arctan\left(\frac{Q}{I}\right) \quad \text{(b)}$$

It may be understood that any apparatus for correcting a deviation between a plurality of transmission channels provided above is configured to perform the method for correcting a deviation between a plurality of transmission channels provided above. Therefore, for beneficial effects that can be achieved by the method, refer to beneficial effects in the corresponding apparatus provided above. Details are not described herein again.

DESCRIPTION OF EMBODIMENTS

A phased array is a phase-controlled electronically scanned array, and is formed by arranging a large quantity of antenna units into an array. Each antenna unit may be controlled by an independent switch, and a radiation direction of an electromagnetic wave is modulated by controlling an amplitude and a phase of the antenna unit in the array, to synthesize a directional scanning-focused beam. A device (for example, a base station or a terminal) in a communications system for which a phased array technology is used may include antenna units and chips (chip). One chip may include a plurality of radio frequency channels. One channel, in the device, used for transmitting or receiving a signal may include one radio frequency channel and one antenna unit. In embodiments of this application, the radio frequency channel and the channel including the radio frequency channel and the antenna unit each may be referred to as a transmission channel.

Figure 1:
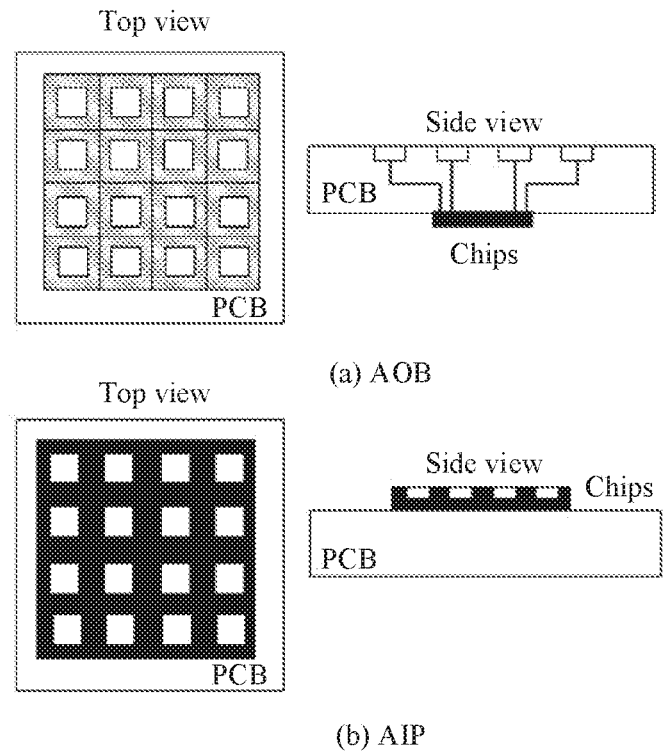
FIG. 1 is a schematic structural diagram of combination forms of antenna units and chips according to an embodiment of this application.

As shown in FIG. 1, that an antenna unit is a patch antenna and a phased array includes a 4×4 antenna array is used as an example. There may be two combination forms of antenna units in the phased array and chips during print design, to be specific, an AOB (antenna on PCB) and an AIP (antenna in package). As shown in (a) in FIG. 1, the AOB means that the antenna units are on a printed circuit board (print circuit board, PCB). The antenna units and the chips may be separately located on two surfaces of the PCB (that is, the antenna units are printed on one surface of the PCB, and the chips are attached to the other surface of the PCB), or may be located on a same surface of the PCB (that is, the antenna units are printed on a surface of the PCB, and the chips are also attached to the surface). In FIG. 1, an example in which the antenna units and the chips are located on different surfaces is used for description. As shown in (b) in FIG. 1, the AIP means that the antenna units are located in a package (package) of the chips. The antenna units are packaged together with the chips. The antenna units may be located at the top of the package of the chips. The chips are attached to the PCB.

Figure 2:
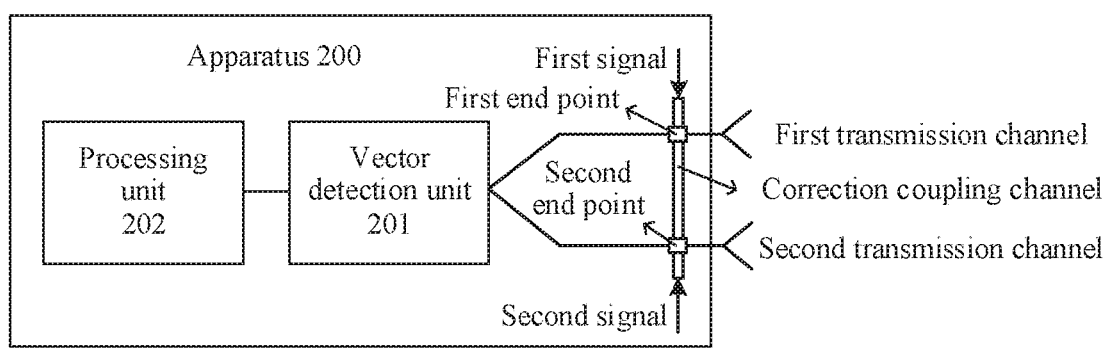
FIG. 2 is a schematic structural diagram of a first apparatus according to an embodiment of this application.

FIG. 2 shows an apparatus for correcting a deviation between a plurality of transmission channels according to an embodiment of this application. The plurality of transmission channels include a first transmission channel, a second transmission channel, and a correction coupling channel. A first endpoint of the correction coupling channel is connected to the first transmission channel. A second endpoint of the correction coupling channel is connected to the second transmission channel. Both the first transmission channel and the second transmission channel are receive channels. As shown in FIG. 2, the apparatus 200 includes a vector detection unit 201 and a processing unit 202.

The vector detection unit 201 is configured to: when a first signal is fed at the first endpoint, detect a first signal vector based on a first feedback signal of the first transmission channel, and detect a second signal vector based on a second feedback signal of the second transmission channel.

The vector detection unit 201 is further configured to: when a second signal is fed at the second endpoint, detect a third signal vector based on a third feedback signal of the first transmission channel, and detect a fourth signal vector based on a fourth feedback signal of the second transmission channel. The second feedback signal and the third feedback signal are propagated in opposite directions on the correction coupling channel.

The vector detection unit 201 may be a unit configured to detect a signal amplitude and/or a signal phase, and a vector may include the signal amplitude and the signal phase. Optionally, the vector detection unit 201 may output two component signals, and the two component signals may be used to determine the signal amplitude and the signal phase. For example, the vector detection unit 201 may include a quadrature receiver or a Hilbert filter, and the quadrature receiver and the Hilbert filter each may be configured to output two component signals: I and Q, so that a signal amplitude A and a signal phase 9 may be determined according to the following formula (a) and formula (b), or the quadrature receiver and the Hilbert filter each may be directly configured to output the signal amplitude A and the signal phase 9.

$$A = 10 \lg(I^2 + Q^2) \quad (a)$$

$$\theta = \arctan\left(\frac{Q}{I}\right) \quad (b)$$

In addition, the correction coupling channel may be configured to feed a signal into the first transmission channel and the second transmission channel. For example, the first signal is fed at the first endpoint, and the second signal is fed at the second endpoint. The first transmission channel and the second transmission channel may receive the signal fed by the correction coupling channel. The correction coupling channel may be a transmission line. The first transmission channel may be connected to the first endpoint of the correction coupling channel by using a coupler (coupler, CP), and the second transmission channel may also be connected to the second endpoint of the correction coupling channel by using a coupler.

When the first signal is fed at the first endpoint of the correction coupling channel, after the first signal is propagated through the first transmission channel, the vector detection unit 201 may receive the first feedback signal, and the vector detection unit 201 may obtain the first signal vector by detecting the first feedback signal. In addition, after the first signal is propagated through the correction coupling channel and the second transmission channel, the vector detection unit 201 may receive the second feedback signal, and the vector detection unit 201 may obtain the second signal vector by detecting the second feedback signal.

When the second signal is fed at the second endpoint of the correction coupling channel, after the second signal is propagated through the correction coupling channel and the first transmission channel, the vector detection unit 201 may receive the third feedback signal, and the vector detection unit 201 may obtain the third signal vector by detecting the third feedback signal. After the second signal is propagated through the second transmission channel, the vector detection unit 201 may receive the fourth feedback signal, and the vector detection unit 201 may obtain the fourth signal vector by detecting the fourth feedback signal.

A transmission direction of the first signal between the first endpoint and the second endpoint of the correction coupling channel is from the first endpoint to the second endpoint, and a transmission direction of the second signal between the first endpoint and the second endpoint of the correction coupling channel is from the second endpoint to the first endpoint. Therefore, the second feedback signal and the third feedback signal that are received by the vector detection unit 201 are propagated in opposite directions between the first endpoint and the second endpoint of the correction coupling channel.

In addition, the vector detection unit 201 may detect each received feedback signal once or for a plurality of times, obtain one signal vector when detecting the feedback signal once, and obtain a plurality of signal vectors when detecting the feedback signal for a plurality of times. For example, the vector detection unit 201 obtains one first signal vector by detecting the first feedback signal once. Alternatively, the vector detection unit 201 obtains a plurality of first signal vectors by detecting the first feedback signal for a plurality of times.

The processing unit 202 is configured to determine a deviation correction value between the first transmission channel and the second transmission channel based on the detected signal vectors, where the deviation correction value is used to correct a deviation between the first transmission channel and the second transmission channel.

When each detected signal vector includes one signal vector, the processing unit 202 may determine the deviation correction value between the first transmission channel and the second transmission channel based on one first signal vector, one second signal vector, one third signal vector, and one fourth signal vector. When each detected signal vector includes a plurality of signal vectors, the processing unit 202 may determine the deviation correction value between the first transmission channel and the second transmission channel based on a plurality of first signal vectors, a plurality of second signal vectors, a plurality of third signal vectors, and a plurality of fourth signal vectors.

In addition, each signal vector may include amplitude information and phase information, and the deviation correction value may include an amplitude correction value between the first transmission channel and the second transmission channel, or may include a phase correction value between the first transmission channel and the second transmission channel. The processing unit 202 may determine the amplitude correction value based on amplitude information in the detected signal vectors, or may determine the phase correction value based on phase information in the detected signal vectors.

The second feedback signal and the third feedback signal are propagated in the opposite directions on the correction coupling channel between the first endpoint and the second endpoint. Therefore, when the deviation correction value between the first transmission channel and the second transmission channel is determined, the deviation correction value may be directly obtained by offsetting transmission deviation values of the correction coupling channel.

For ease of understanding, herein, an example in which each signal vector includes one signal vector is used for description. If the first signal vector is $(A_1, \theta_1)$, the second signal vector is $(A_2, \theta_2)$, the third signal vector is $(A_3, \theta_3)$, and the fourth signal vector is $(A_4, \theta_4)$, the processing unit 202 may determine the amplitude correction value $\Delta A$ between the first transmission channel and the second transmission channel based on $A_1, A_2, A_3$, and $A_4$, and determine the phase correction value $\Delta \theta$ based on $\theta_1, \theta_2, \theta_3$, and $\theta_4$. For example, the processing unit 202 may determine $\Delta A$ according to the following formula (1), and determine $\Delta \theta$ between the first transmission channel and the second transmission channel according to the following formula (2):

$$\Delta A = \tfrac{1}{2}(A_2 - A_1 + A_4 - A_3) \quad (1)$$

$$\Delta \theta = \tfrac{1}{2}(\theta_2 - \theta_1 + \theta_4 - \theta_3) \quad (2)$$

Optionally, transmission deviations of the correction coupling channel may include a transmission amplitude deviation and a transmission phase deviation. The processing unit 202 may be further configured to determine, based on the detected signal vectors, a transmission amplitude deviation and a transmission phase deviation of the signals that are caused by the correction coupling channel between the first endpoint and the second endpoint. For example, the processing unit 202 may respectively determine, according to the following formulas (3) and (4), a transmission amplitude deviation γ and a transmission phase deviation β of the signals that are caused by the correction coupling channel.

$$\gamma = \frac{1}{2}(A_1 - A_2 + A_4 - A_3) \quad (3)$$

$$\beta = \frac{1}{2}(\theta_1 - \theta_2 + \theta_4 - \theta_3) \quad (4)$$

The foregoing formulas (1) to (4) are merely examples. The processing unit 202 may alternatively determine, based on the detected signal vector in another manner, the amplitude correction value and the phase correction value between the first transmission channel and the second transmission channel and the transmission amplitude deviation and the transmission phase deviation of the signals that are caused by the correction coupling channel.

After the amplitude correction value and the phase correction value between the first transmission channel and the second transmission channel are determined, the first transmission channel or the second transmission channel may be compensated for based on the amplitude correction value, to correct an amplitude deviation between the first transmission channel and the second transmission channel; and/or the first transmission channel or the second transmission channel may be compensated for based on the phase correction value, to correct a phase deviation between the first transmission channel and the second transmission channel. For example, a phase shifter (phase shifter, PS) is disposed on the first transmission channel and/or the second transmission channel, and the amplitude correction value and the phase correction value between the first transmission channel and the second transmission channel are set by using the PS.

In this embodiment of this application, when both the first transmission channel and the second transmission channel are receive channels, and the first signal is fed at the first endpoint and the second signal is fed at the second endpoint, the plurality of signal vectors are detected based on the plurality of feedback signals of the first transmission channel and the second transmission channel, because the second feedback signal and the third feedback signal are propagated in the opposite directions between the first endpoint and the second endpoint of the correction coupling channel, the deviation correction value between the first transmission channel and the second transmission channel may be determined based on the detected signal vectors of the feedback signals, so that transmission deviation values of the correction coupling channel are offset, and further, correction accuracy of the receive channels can be improved when correction is performed based on the deviation correction value.

Figure 3:
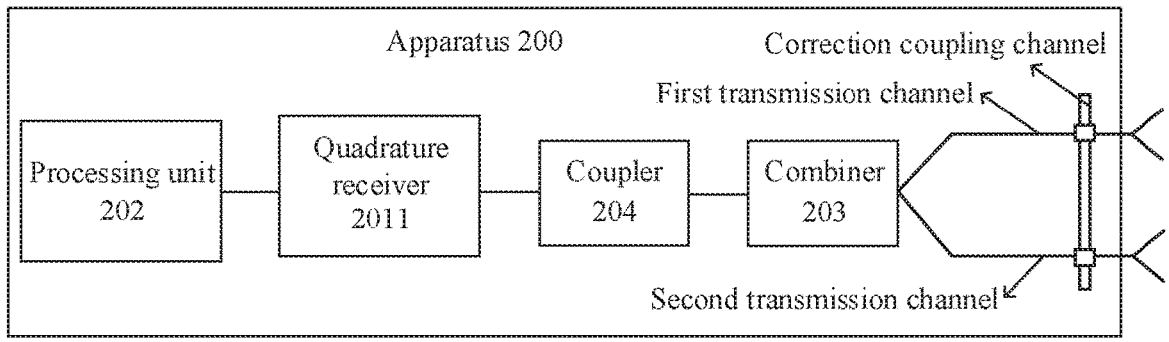
FIG. 3 is a schematic structural diagram of a second apparatus according to an embodiment of this application.

Further, as shown in FIG. 3, the vector detection unit 201 may include a quadrature receiver 2011. The first transmission channel and the second transmission channel are combined by using a combiner 203. The quadrature receiver 2011 is connected to the combiner 203 by using a coupler 204.

The first signal is fed at the first endpoint, and the quadrature receiver 2011 separately performs frequency mixing processing on the first signal and the first feedback signal and on the first signal and the second feedback signal, to obtain the first signal vector and the second signal vector. The second signal is fed at the first endpoint, and the quadrature receiver 2011 separately performs frequency mixing processing on the second signal and the third feedback signal and on the second signal and the fourth feedback signal, to obtain the third signal vector and the fourth signal vector.

Specifically, the first signal is fed at the first endpoint. When the first transmission channel is opened and the second transmission channel is closed, the first signal is propagated to the combiner 203 through the first transmission channel, the quadrature receiver 2011 receives the first feedback signal output by the coupler 204 in a coupling manner from the combiner 203, and the quadrature receiver 2011 performs frequency mixing processing on the first signal and the first feedback signal, to obtain the first signal vector. When the first transmission channel is closed and the second transmission channel is opened, the first signal is propagated to the combiner 203 through the correction coupling channel from the first endpoint to the second endpoint and the second transmission channel, the quadrature receiver 2011 receives the second feedback signal output by the coupler 204 from the combiner 203 in a coupling manner, and the quadrature receiver 2011 performs frequency mixing processing on the first signal and the second feedback signal, to obtain the second signal vector. Likewise, the second signal is fed at the second endpoint. When the first transmission channel is opened and the second transmission channel is closed, the second signal is propagated to the combiner 203 through the correction coupling channel from the first endpoint to the second endpoint and the first transmission channel, the quadrature receiver 2011 receives the third feedback signal output by the coupler 204 from the combiner 203 in a coupling manner, and the quadrature receiver 2011 performs frequency mixing processing on the second signal and the third feedback signal, to obtain the third signal vector. When the first transmission channel is closed and the second transmission channel is opened, the second signal is propagated to the combiner 203 through the second transmission channel, the quadrature receiver 2011 receives the fourth feedback signal output by the coupler 204 from the combiner 203 in a coupling manner, and the quadrature receiver 2011 performs frequency mixing processing on the second signal and the fourth feedback signal, to obtain the fourth signal vector.

Figure 4:
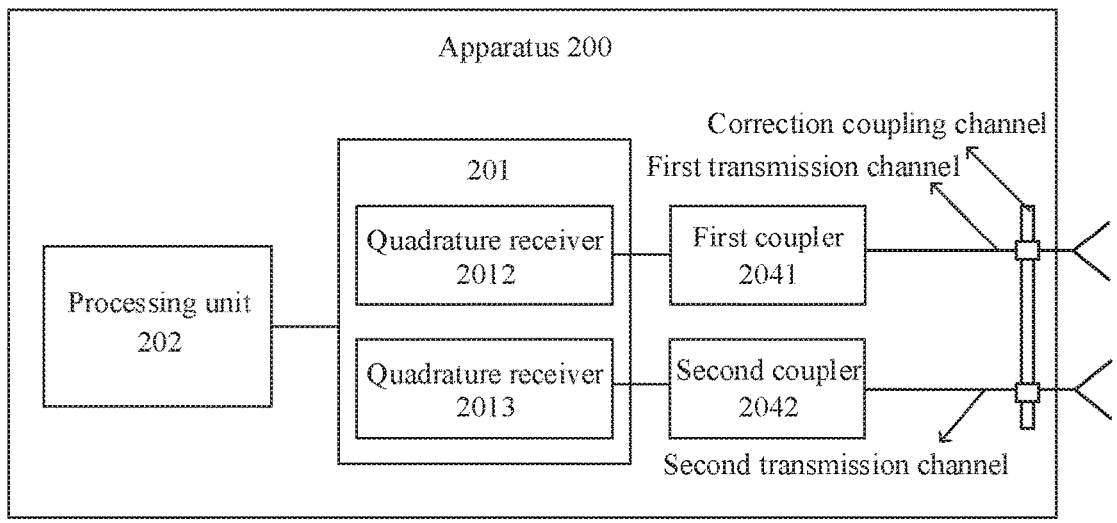
FIG. 4 is a schematic structural diagram of a third apparatus according to an embodiment of this application.

Alternatively, as shown in FIG. 4, the vector detection unit 201 may include a first quadrature receiver 2012 and a second receiver 2013. The first quadrature receiver 2012 is connected to the first transmission channel by using a first coupler 2041. The second quadrature receiver 2013 is connected to the second transmission channel by using a second coupler 2042. The first signal is fed at the first endpoint. After the first signal is propagated through the first transmission channel, the first quadrature receiver 2012 receives the first feedback signal output by the first coupler 2041 from the first transmission channel in a coupling manner, and the first quadrature receiver 2012 performs frequency mixing processing on the first signal and the first feedback signal, to obtain the first signal vector. After the first signal is propagated through the correction coupling channel from the first endpoint to the second endpoint and the second transmission channel, the second quadrature receiver 2013 receives the second feedback signal output by the second coupler 2042 from the second transmission channel in a coupling manner, and the second quadrature receiver 2013 performs frequency mixing processing on the first signal and the second feedback signal, to obtain the second signal vector. The second signal is fed at the second endpoint. After the second signal is propagated through the correction coupling channel from the second endpoint to the first endpoint and the first transmission channel, the first quadrature receiver 2012 receives the third feedback signal output by the first coupler 2041 from the first transmission channel in a coupling manner, and the first quadrature receiver 2012 performs frequency mixing processing on the second signal and the third feedback signal, to obtain the third signal vector. After the second signal is propagated through the second transmission channel, the second quadrature receiver 2013 receives the fourth feedback signal output by the second coupler 2042 from the second transmission channel in a coupling manner, and the second quadrature receiver 2013 performs frequency mixing processing on the second signal and the fourth feedback signal, to obtain the fourth signal vector.

Figure 5:
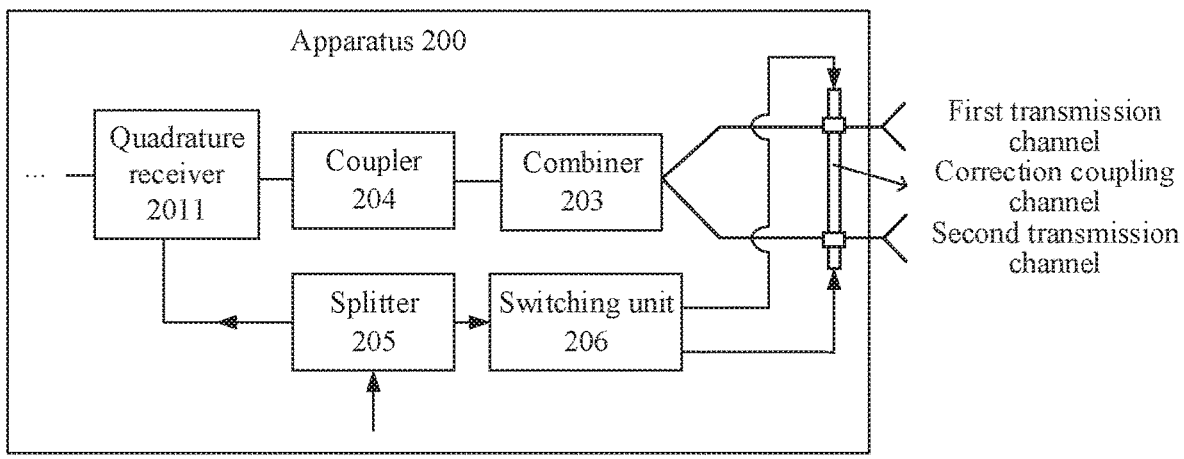
FIG. 5 is a schematic structural diagram of a fourth apparatus according to an embodiment of this application.
Figure 6:
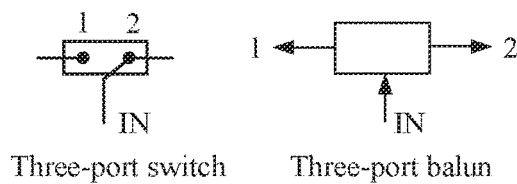
FIG. 6 is a schematic structural diagram of switching units according to an embodiment of this application.

Further, with reference to FIG. 3, as shown in FIG. 5, the apparatus further includes a splitter 205. The splitter 205 is connected to the quadrature receiver 2011. The splitter 205 is further connected to the first endpoint and the second endpoint of the correction coupling channel by using a switching unit 206. Optionally, as shown in FIG. 6, the switching unit 206 may be a three-port switch or a three-port balun. A port IN is connected to the splitter 205. A port 1 and a port 2 are respectively connected to the first endpoint and the second endpoint.

When the splitter 205 is connected to the first endpoint of the correction coupling channel by using the switching unit 206, the splitter 205 is configured to split the first signal to the quadrature receiver 2011 and the first endpoint. Frequency mixing processing is separately performed on a part of the first signal that is at the quadrature receiver 2011 and that is obtained through splitting and the first feedback signal and on the part of the first signal and the second feedback signal. A part of the first signal that is at the first endpoint and that is obtained through splitting is fed from the first endpoint. When the splitter 205 is connected to the second endpoint by using the switching unit 206, the splitter 205 is configured to split the second signal to the quadrature receiver 2011 and the second endpoint. Frequency mixing processing is separately performed on a part of the second signal that is at the quadrature receiver 2011 and that is obtained through splitting and the third feedback signal and on the part of the second signal and the fourth feedback signal. A part of the second signal that is at the second endpoint and that is obtained through splitting is fed from the second endpoint.

Figure 7:
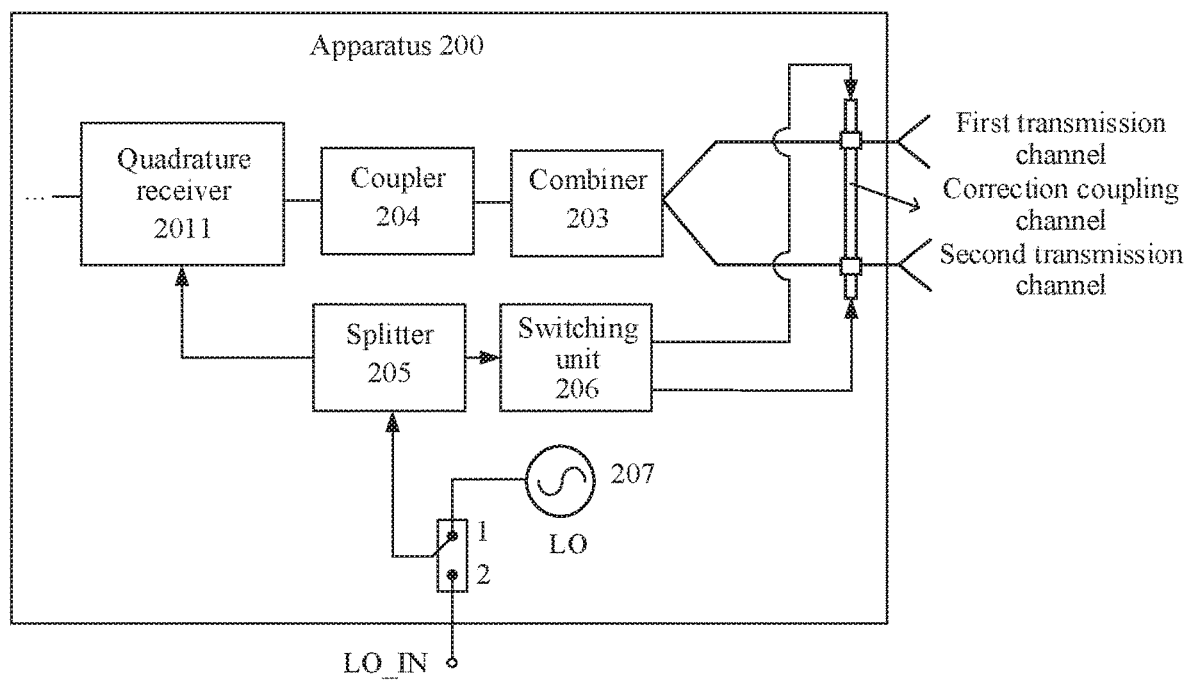
FIG. 7 is a schematic structural diagram of a fifth apparatus according to an embodiment of this application.

Further, with reference to FIG. 5, as shown in FIG. 7, the apparatus 200 may be an apparatus into which a radio frequency (radio frequency, RF) signal is input. For example, the radio frequency apparatus is a radio frequency chip or a radio frequency module. The first signal and the second signal may be radio frequency signals from the outside. For example, a radio frequency signal from the outside may be generated by an external local oscillator (local oscillator, LO). Alternatively, the apparatus further includes a signal generator 207 connected to the splitter 205. The signal generator 207 is configured to generate radio frequency signals. The radio frequency signals include the first signal and the second signal. Optionally, the signal generator 207 may be a local oscillator. In FIG. 7, an example in which the signal generator 207 is an LO is used for description, and LO_IN represents input of an external LO.

Figure 8:
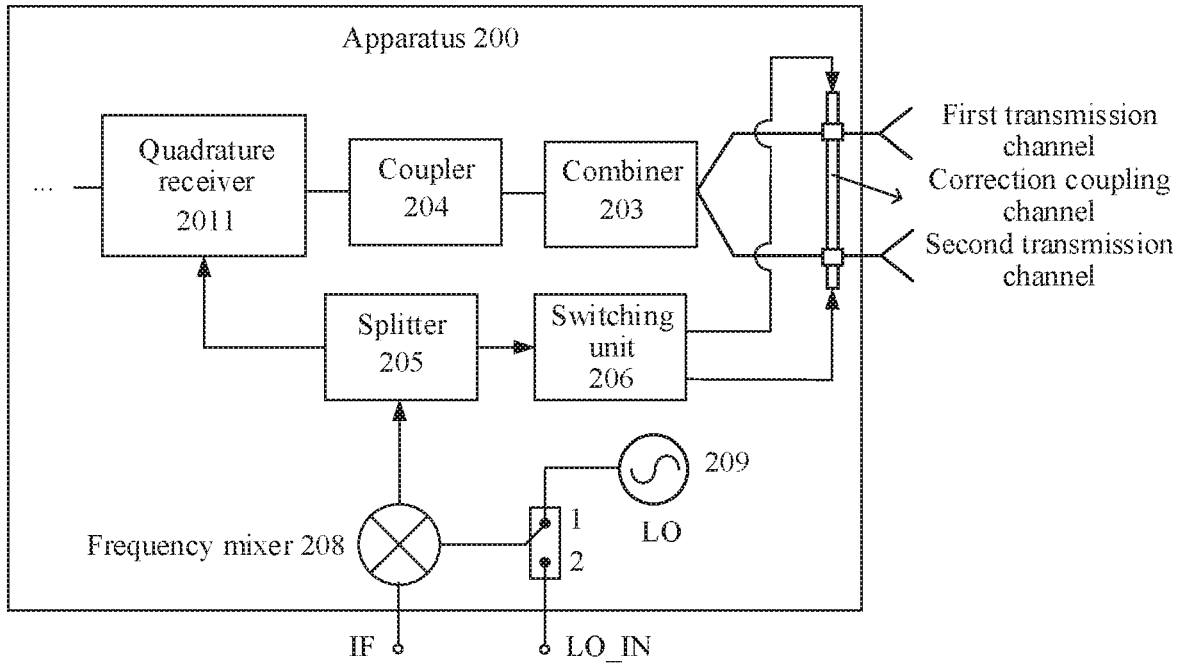
FIG. 8 is a schematic structural diagram of a sixth apparatus according to an embodiment of this application.

Further, with reference to FIG. 5, as shown in FIG. 8, the apparatus 200 may be an apparatus into which an intermediate frequency (intermediate frequency, IF) signal is input. For example, if the apparatus includes an intermediate frequency chip or an intermediate frequency module, the apparatus may further include a frequency mixer 208. The frequency mixer 208 is configured to perform frequency mixing processing on the intermediate frequency signal and correction signals, to obtain the first signal and the second signal. The correction signal may be from the outside. For example, the correction signal from the outside may be generated by an external LO. Alternatively, the apparatus further includes a signal generator 209 connected to the splitter 205 by using the frequency mixer 208. The signal generator 209 is configured to generate the correction signal. Optionally, the signal generator 209 may be an LO. In FIG. 8, an example in which the signal generator 209 is an LO is used for description. LO_IN represents input of an external LO, and An IF represents an input end of the intermediate frequency signal.

Figure 9:
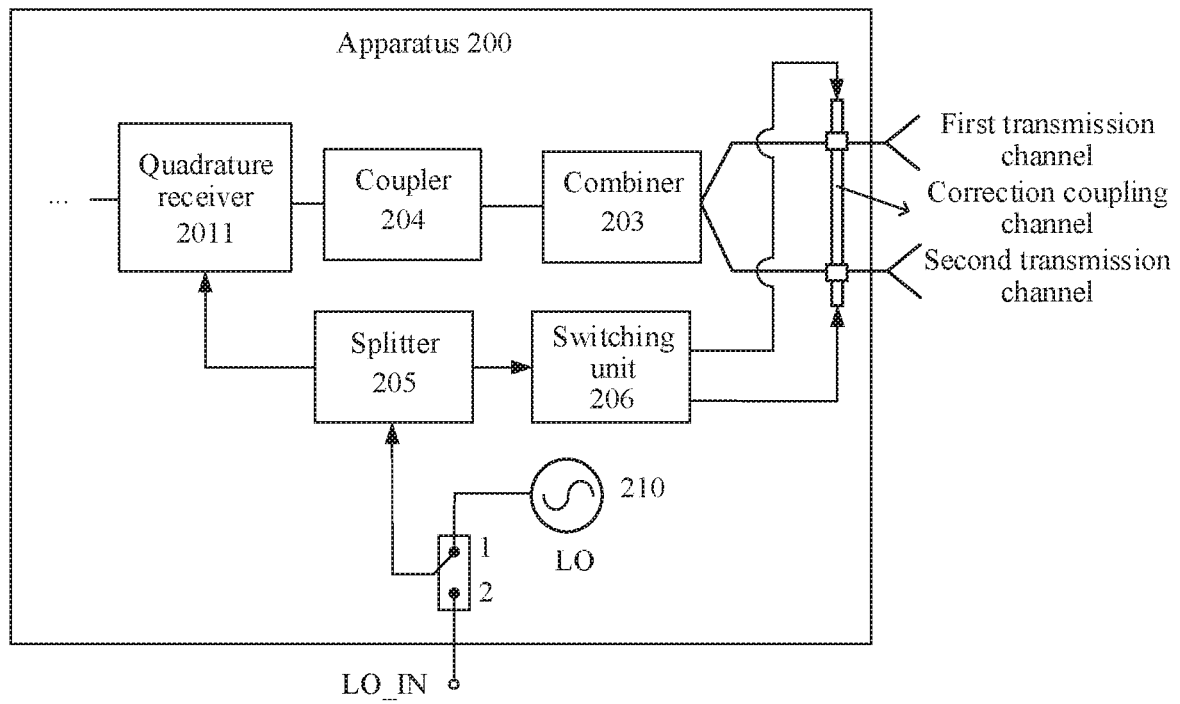
FIG. 9 is a schematic structural diagram of a seventh apparatus according to an embodiment of this application.

Further, with reference to FIG. 5, as shown in FIG. 9, the apparatus 200 may be an apparatus into which a baseband signal is input. For example, the apparatus includes a baseband chip or a baseband module. The first signal and the second signal are from the outside. For example, the first signal and the second signal may be generated by an external LO. Alternatively, the apparatus further includes a signal generator 210 connected to the splitter 205. The signal generator 210 is configured to generate the first signal and the second signal. In FIG. 9, an example in which the signal generator 210 is an LO is used for description, and LO_IN represents input of an external LO.

During actual application, the apparatus into which the baseband signal is input may usually include the baseband module, an intermediate frequency module, and a radio frequency module. When the apparatus is the apparatus into which the baseband signal is input, the first signal and the second signal may be provided by the radio frequency module, may be provided by the intermediate frequency module, or may be provided by the baseband module. This is not specifically limited in this embodiment of this application.

Further, the plurality of transmission channels further include a third transmission channel. The third transmission channel is connected to a third endpoint of the correction coupling channel. The apparatus is further configured to correct a deviation between the first transmission channel and the third transmission channel, and/or correct a deviation between the second transmission channel and the third transmission channel.

Herein, that the deviation between the first transmission channel and the third transmission channel is corrected is used as an example for description. The vector detection unit 201 is further configured to: when the first signal is fed at the first endpoint, detect a fifth signal vector based on a fifth feedback signal of the first transmission channel, and detect a sixth signal vector based on a sixth feedback signal of the third transmission channel. The vector detection unit 201 is further configured to: when a third signal is fed at the third endpoint, detect a seventh signal vector based on a seventh feedback signal of the first transmission channel, and detect an eighth signal vector based on an eighth feedback signal of the third transmission channel. The sixth feedback signal and the seventh feedback signal are propagated in opposite directions on the correction coupling channel. The processing unit 202 is further configured to determine a deviation correction value between the first transmission channel and the third transmission channel based on the detected signal vectors. Transmission deviation values of the correction coupling channel are offset by each other. The deviation correction value is used to correct the deviation between the first transmission channel and the third transmission channel.

It should be noted that a specific implementation in which the apparatus 200 is further configured to correct the deviation between the first transmission channel and the third transmission channel, and/or correct the deviation between the second transmission channel and the third transmission channel is similar to the foregoing specific implementation in which the deviation between the first transmission channel and the second transmission channel is corrected. For details, refer to the foregoing related descriptions of correcting the deviation between the first transmission channel and the second transmission channel. Details are not described herein again in this embodiment of this application.

Figure 10:
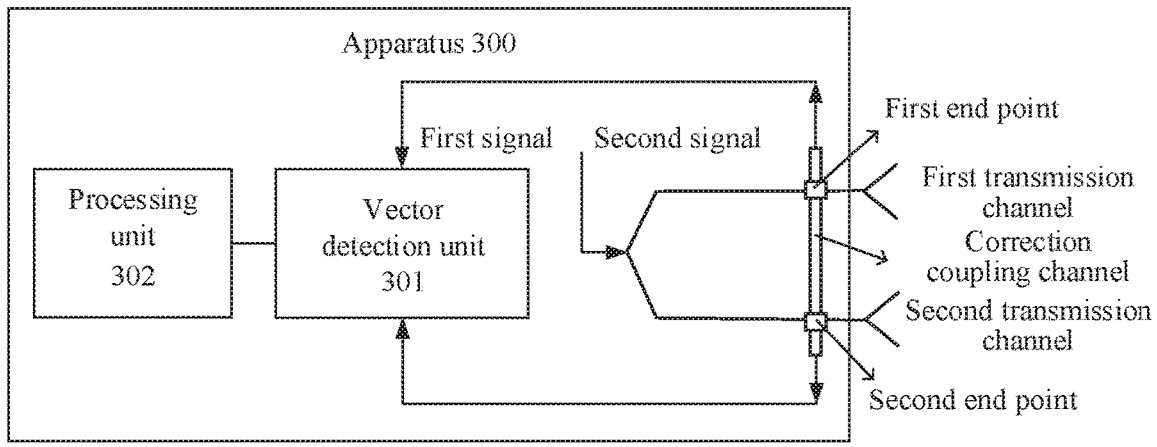
FIG. 10 is a schematic structural diagram of an eighth apparatus according to an embodiment of this application.

FIG. 10 shows another apparatus for correcting a deviation between a plurality of transmission channels according to an embodiment of this application. The plurality of transmission channels include a first transmission channel, a second transmission channel, and a correction coupling channel. A first endpoint of the correction coupling channel is connected to the first transmission channel. A second endpoint of the correction coupling channel is connected to the second transmission channel. Both the first transmission channel and the second transmission channel are transmit channels. As shown in FIG. 10, the apparatus 300 includes a vector detection unit 301 and a processing unit 302.

The vector detection unit 301 is configured to: when a first signal is input into the first transmission channel and the second transmission channel, detect a first signal vector based on a first feedback signal of the first transmission channel that is output from the first endpoint, and detect a second signal vector based on a second feedback signal of the second transmission channel that is output from the first endpoint.

The vector detection unit 301 is further configured to: when a second signal is input into the first transmission channel and the second transmission channel, detect a third signal vector based on a third feedback signal of the first transmission channel that is output from the second endpoint, and detect a fourth signal vector based on a fourth feedback signal of the second transmission channel that is output from the second endpoint. The second feedback signal and the third feedback signal are propagated in opposite directions on the correction coupling channel.

The vector detection unit 301 may be a unit configured to detect a signal amplitude and/or a signal phase, and a vector may include the signal amplitude and the signal phase. Optionally, the vector detection unit 301 may output two component signals. The two component signals may be used to determine the signal amplitude and the signal phase.

In addition, both the first transmission channel and the second transmission channel are transmit channels, and may propagate the first signal and the second signal that are used for correction. The correction coupling channel may be used to receive the signals propagated on the first transmission channel and the second transmission channel. Optionally, the correction coupling channel may be a transmission line. The first transmission channel may be connected to the first endpoint of the correction coupling channel by using a coupler (coupler, CP). The second transmission channel may alternatively be connected to the second endpoint of the correction coupling channel by using a coupler.

When the first signal is input into the first transmission channel and the second transmission channel, after the first signal is propagated through the first transmission channel, the vector detection unit 301 may receive the first feedback signal at the first endpoint of the correction coupling channel. The vector detection unit 301 may obtain the first signal vector by detecting the first feedback signal. In addition, after the first signal is propagated through the second transmission channel and the correction coupling channel, the vector detection unit 301 may receive the second feedback signal at the first endpoint of the correction coupling channel. The vector detection unit 301 may obtain the second signal vector by detecting the second feedback signal.

When the second signal is input into the first transmission channel and the second transmission channel, after the first signal is propagated through the first transmission channel and the correction coupling channel, the vector detection unit 301 may receive the third feedback signal at the second endpoint of the correction coupling channel. The vector detection unit 301 may obtain the third signal vector by detecting the third feedback signal. In addition, after the second signal is propagated through the second transmission channel, the vector detection unit 301 may receive the fourth feedback signal at the second endpoint of the correction coupling channel. The vector detection unit 301 may obtain the fourth signal vector by detecting the fourth feedback signal.

A transmission direction of the second feedback signal between the first endpoint and the second endpoint of the correction coupling channel is from the second endpoint to the first endpoint, and a transmission direction of the third feedback signal between the first endpoint and the second endpoint of the correction coupling channel is from the first endpoint to the second endpoint. Therefore, the second feedback signal and the third feedback signal that are received by the vector detection unit 301 are propagated in opposite directions between the first endpoint and the second endpoint of the correction coupling channel.

In addition, the vector detection unit 301 may detect each received feedback signal once or for a plurality of times, obtain one signal vector when detecting the feedback signal once, and obtain a plurality of signal vectors when detecting the feedback signal for a plurality of times. For example, the vector detection unit 301 obtains one first signal vector by detecting the first feedback signal once. Alternatively, the vector detection unit 301 obtains a plurality of first signal vectors by detecting the first feedback signal for a plurality of times.

The processing unit 302 is configured to determine a deviation correction value between the first transmission channel and the second transmission channel based on the detected signal vectors, where the deviation correction value is used to correct a deviation between the first transmission channel and the second transmission channel.

When each detected signal vector includes one signal vector, the processing unit 302 may determine the deviation correction value between the first transmission channel and the second transmission channel based on one first signal vector, one second signal vector, one third signal vector, and one fourth signal vector. When each detected signal vector includes a plurality of signal vectors, the processing unit 302 may determine the deviation correction value between the first transmission channel and the second transmission channel based on a plurality of first signal vectors, a plurality of second signal vectors, a plurality of third signal vectors, and a plurality of fourth signal vectors.

In addition, each signal vector may include amplitude information and phase information, and the deviation correction value may include an amplitude correction value between the first transmission channel and the second transmission channel, or may include a phase correction value between the first transmission channel and the second transmission channel. The processing unit 302 may determine the amplitude correction value based on amplitude information in the detected signal vectors, or may determine the phase correction value based on phase information in the detected signal vectors.

The second feedback signal and the third feedback signal are propagated in the opposite directions on the correction coupling channel between the first endpoint and the second endpoint. Therefore, when the deviation correction value between the first transmission channel and the second transmission channel is determined, transmission deviation values of the correction coupling channel may be offset, and further, the deviation between the first transmission channel and the second transmission channel may be corrected directly based on the deviation correction value.

It should be noted that, the manner of determining the deviation correction value between the first transmission channel and the second transmission channel based on the detected signal vectors and correcting the deviation between the first transmission channel and the second transmission channel is consistent with the manner of determining the deviation correction value between the first transmission channel and the second transmission channel and correcting the deviation between the first transmission channel and the second transmission channel in the embodiment shown in FIG. 2. For details, refer to the descriptions in the foregoing embodiment. Details are not described again in this embodiment of this application.

In this embodiment of this application, when the first transmission channel and the second transmission channel are transmit channels, and the first signal and the second signal are separately input, the plurality of signal vectors are respectively detected by using the feedback signals of the first transmission channel and the second transmission channel that are output from the first endpoint and the second endpoint. The second feedback signal and the third feedback signal are propagated in the opposite directions on the correction coupling channel. Therefore, the deviation correction value between the first transmission channel and the second transmission channel may be determined based on the plurality of detected signal vectors, so that the transmission deviation values of the correction coupling channel are offset, and further, when correction is performed based on the deviation correction value, correction accuracy of receive channels can be improved.

Figure 11:
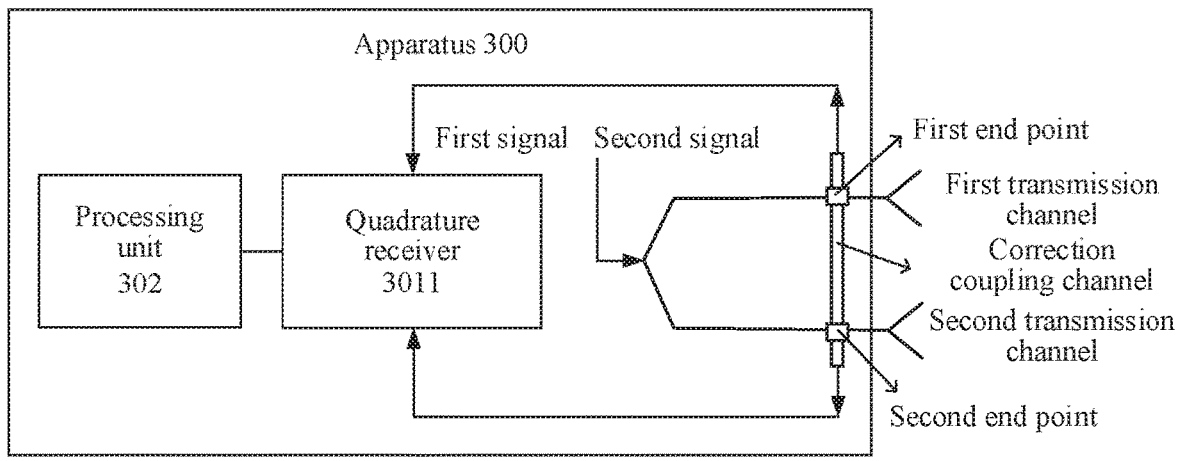
FIG. 11 is a schematic structural diagram of a ninth apparatus according to an embodiment of this application.

Further, as shown in FIG. 11, the vector detection unit 301 may include a quadrature receiver 3011. The quadrature receiver 3011 is connected to the first endpoint and the second endpoint of the correction coupling channel.

When the first signal is input into the first transmission channel and the second transmission channel, and the first signal vector and the second signal vector are to be detected, the quadrature receiver 3011 separately performs frequency mixing processing on the first signal and the first feedback signal and on the first signal and the second feedback signal, to obtain the first signal vector and the second signal vector. When the second signal is input into the first transmission channel and the second transmission channel, and the third signal vector and the fourth signal vector are to be detected, the quadrature receiver 3011 separately performs frequency mixing processing on the second signal and the third feedback signal and on the second signal and the fourth feedback signal, to obtain the third signal vector and the fourth signal vector.

Specifically, the first transmission channel and the second transmission channel each may include a separate input end, or the first transmission channel and the second transmission channel may include a same input end. In FIG. 11, an example in which the first transmission channel and the second transmission channel include the same input end is used for description. If the first transmission channel and the second transmission channel each includes the separate input end, and the first signal is separately input into the first transmission channel and the second transmission channel, the quadrature receiver 3011 separately receives the first feedback signal and the second feedback signal by using the first endpoint. The quadrature receiver 3011 performs frequency mixing processing on the first signal and the first feedback signal, to obtain the first signal vector, and performs frequency mixing processing on the first signal and the second feedback signal, to obtain the second signal vector. Likewise, if the first transmission channel and the second transmission channel each includes the separate input end, and the second signal is separately input into the first transmission channel and the second transmission channel, the quadrature receiver 3011 separately receives the third feedback signal and the fourth feedback signal by using the second endpoint. The quadrature receiver 3011 performs frequency mixing processing on the second signal and the third feedback signal, to obtain the third signal vector, and performs frequency mixing processing on the second signal and the fourth feedback signal, to obtain a fourth signal vector.

If the first transmission channel and the second transmission channel include the same input end, when the first transmission channel is opened and the second transmission channel is closed, the quadrature receiver 3011 may receive the first feedback signal by using the first endpoint, and the quadrature receiver 3011 performs frequency mixing processing on the first signal and the first feedback signal, to obtain the first signal vector; or when the first transmission channel is closed and the second transmission channel is opened, the quadrature receiver 3011 may receive the second feedback signal by using the first endpoint, and the quadrature receiver 3011 performs frequency mixing processing on the first signal and the second feedback signal, to obtain the second signal vector. Likewise, if the first transmission channel and the second transmission channel include the same input end, when the first transmission channel is opened and the second transmission channel is closed, the quadrature receiver 3011 may receive the third feedback signal by using the second endpoint, and the quadrature receiver 3011 performs frequency mixing processing on the second signal and the third feedback signal, to obtain the third signal vector; or when the first transmission channel is closed and the second transmission channel is opened, the quadrature receiver 3011 may receive the fourth feedback signal by using the second endpoint, and the quadrature receiver 3011 performs frequency mixing processing on the second signal and the fourth feedback signal, to obtain the fourth signal vector.

Figure 12:
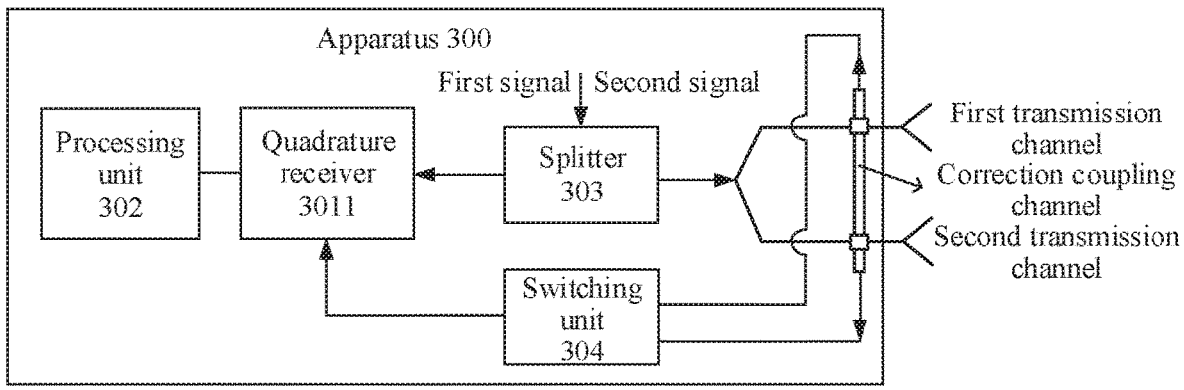
FIG. 12 is a schematic structural diagram of a tenth apparatus according to an embodiment of this application.

Further, with reference to FIG. 11, referring to FIG. 12, the apparatus further includes a splitter 303. The splitter 303 is connected to the first transmission channel, the second transmission channel, and the quadrature receiver 3011. The splitter 303 is configured to separately input the first signal and the second signal into the first transmission channel, the second transmission channel, and the quadrature receiver 3011. The quadrature receiver 3011 is connected to the first endpoint and the second endpoint of the correction coupling channel by using a switching unit 304. When the quadrature receiver 3011 is connected to the first endpoint by using the switching unit 304, the quadrature receiver 3011 may receive the first feedback signal and the second feedback signal that are output from the first endpoint. When the quadrature receiver 3011 is connected to the second endpoint by the switching unit 304, the quadrature receiver 3011 receives the third feedback signal and the fourth feedback signal that are output from the second endpoint. Optionally, the switching unit 304 may be the three-port switch or the three-port balun shown in FIG. 6. The port IN is connected to the splitter 303. The port 1 and the port 2 are respectively connected to the first endpoint and the second endpoint.

The apparatus may be an apparatus into which a radio frequency signal is input. For example, the apparatus is a radio frequency chip or a radio frequency module. The first signal and the second signal may be radio frequency signals from the outside. For example, a radio frequency signal from the outside may be generated by an external LO. Alternatively, the apparatus further includes a signal generator connected to the splitter 303. The signal generator is configured to generate radio frequency signals. The radio frequency signals include the first signal and the second signal. Optionally, the signal generator may be an LO.

Alternatively, the apparatus may be an apparatus into which an intermediate frequency signal is input. For example, if the apparatus includes an intermediate frequency chip or an intermediate frequency module, the apparatus may further include a frequency mixer. The frequency mixer is configured to perform frequency mixing processing on the intermediate frequency signal and correction signals, to obtain the first signal and the second signal. The correction signal may be from the outside. For example, the correction signal from the outside may be generated by an external LO. Alternatively, the apparatus further includes a signal generator connected to the splitter 303 by using the frequency mixer. The signal generator is configured to generate the correction signal. Optionally, the signal generator may be an LO.

Alternatively, the apparatus may be an apparatus into which a baseband signal is input. For example, the apparatus includes a baseband chip or a baseband module. The first signal and the second signal are from the outside. For example, the first signal and the second signal may be generated by an external LO. Alternatively, the apparatus further includes a signal generator connected to the splitter 303. The signal generator is configured to generate the first signal and the second signal. Optionally, the signal generator may be an LO.

It should be noted that, when the apparatus is the apparatus into which the radio frequency signal is input, the apparatus into which the intermediate frequency signal is input, or the apparatus into which the baseband signal is input, a connection relationship between the splitter 303 and each signal generator is respectively consistent with a connection relationship, shown in each of FIG. 7 to FIG. 9, between the splitter 205 and each of the signal generator 207, the signal generator 209, and the signal generator 210. For details, refer to related descriptions about FIG. 7 to FIG. 9.

During actual application, the first transmission channel and the second transmission channel may be used as the transmit channels, or may be used as receive channels. The first transmission channel and the second transmission channel may be switched by using a TRX module. When the TRX module is in a receive (RX) state, the first transmission channel and the second transmission channel are receive channels. When the TRX module is in a transmit (TX) state, the first transmission channel and the second transmission channel are transmit channels. Therefore, an apparatus for correcting receive channels and an apparatus for correcting transmit channels may be integrated as a whole.

Figure 13:
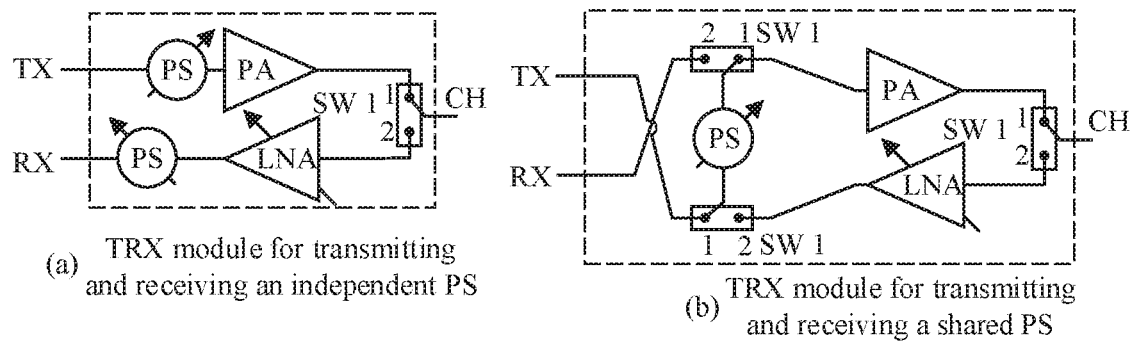
FIG. 13 is a schematic structural diagram of TRX modules according to an embodiment of this application.

FIG. 13 is a schematic structural diagram of a TRX module. An example in which a transmit channel includes a phase shifter (PS) and a power amplifier (power amplifier, PA), and a receive channel includes a PS and a low noise amplifier (low noise amplifier, LNA) is used for description. (a) in FIG. 13 shows a TRX module for transmitting and receiving an independent PS. When an SW 1 is located at a position 1, the TRX module is in a TX state. When the SW 1 is located at a position 2, the TRX module is in an RX state. SWs in FIG. 13 represent switches (switch). (b) in FIG. 13 shows a TRX module for transmitting and receiving a shared PS. When a plurality of SWs 1 are all located at positions 1, the TRX module is in a TX state. When the plurality of SWs 1 are all located at positions 2, the TRX module is in an RX state.

Figure 14:
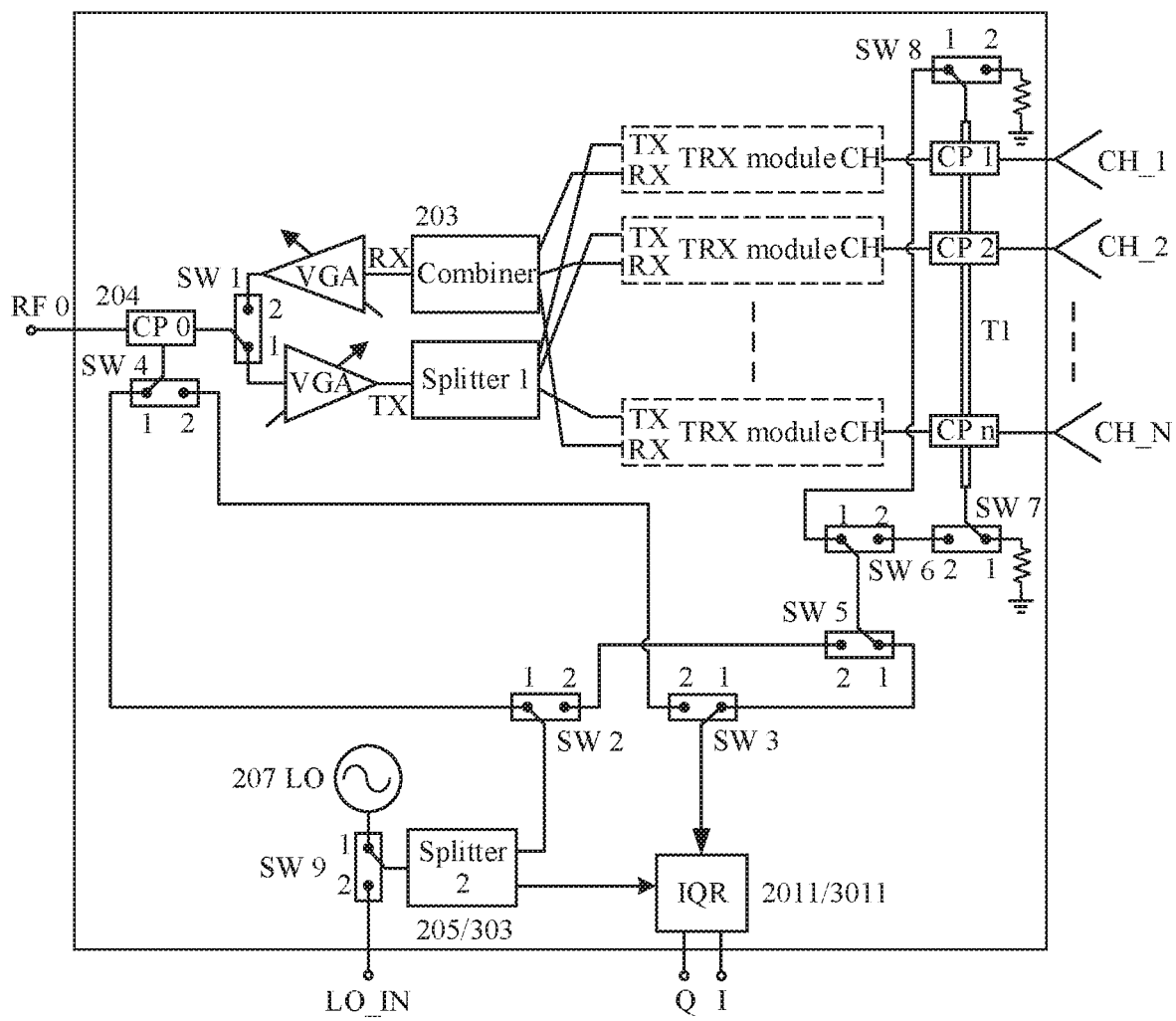
FIG. 14 is a schematic structural diagram of an eleventh apparatus according to an embodiment of this application.

For example, with reference to FIG. 13, when the apparatus for correcting the receive channels and the apparatus for correcting the transmit channels each are an apparatus into which a radio frequency signal is input, an integrated apparatus may be shown in FIG. 14. FIG. 14 includes a plurality of SWs (an SW 1 to an SW 9, where there are a plurality of SWs 1, and the plurality of SWs 1 include the SWs 1 in FIG. 13). IQR represents the quadrature receiver (that is, the quadrature receiver 2011 or 3011). CH_1 to CH_N represent the plurality of transmission channels. T1 represents the correction coupling channel. An example in which CH_1 is the first transmission channel, and CH_N is the second transmission channel is used. A CP 1 may represent the first endpoint. A CP n may represent the second endpoint. I and Q may represent an I component and a Q component of a signal vector output by IQR. In FIG. 14, a VGA represents a variable gain amplifier (variable gain amplifier). The switching unit 206 or the switching unit 304 may include the SW 6 to the SW 8. An RF 0 is an input end of a radio frequency signal.

When the SW 1 to the SW 5 are all located at positions 1, the apparatus is configured to correct a deviation between the transmit channels. In addition, when the SW 6 to the SW 8 are all located at positions 1, IQR may receive a feedback signal output from the CP 1 in a coupling manner (that is, detect a feedback signal output from the first endpoint). When the SW 6 to the SW 8 are all located at positions 2, IQR may receive a feedback signal output from the CP n in a coupling manner (that is, detect a feedback signal output from the second endpoint). When the SW 9 is located at a position 1, an LO is configured to input the first signal and the second signal. When the SW 9 is located at a position 2, the input first signal and second signal are from the outside.

When the SW 1 to the SW 5 are all located at positions 2, the apparatus is configured to correct a deviation between the receive channels. In addition, when the SW 6 to the SW 8 are all located at the positions 1, the first signal is input from the CP 1 in a coupling manner (that is, fed from the first endpoint), and IQR may receive feedback signals of the receive channels CH_1 and CH_N that are output from a CP 0 (that is, the coupler 204 in FIG. 3) in a coupling manner. When the SW 6 to the SW 8 are all located at the positions 2, IQR may receive the feedback signals of the receive channels CH_1 and CH_N that are output from the CP 0 in a coupling manner. When the SW 9 is located at the position 1, the LO is configured to generate the first signal and the second signal. When the SW 9 is located at the position 2, the first signal and the second signal are from the outside.

Figure 15:
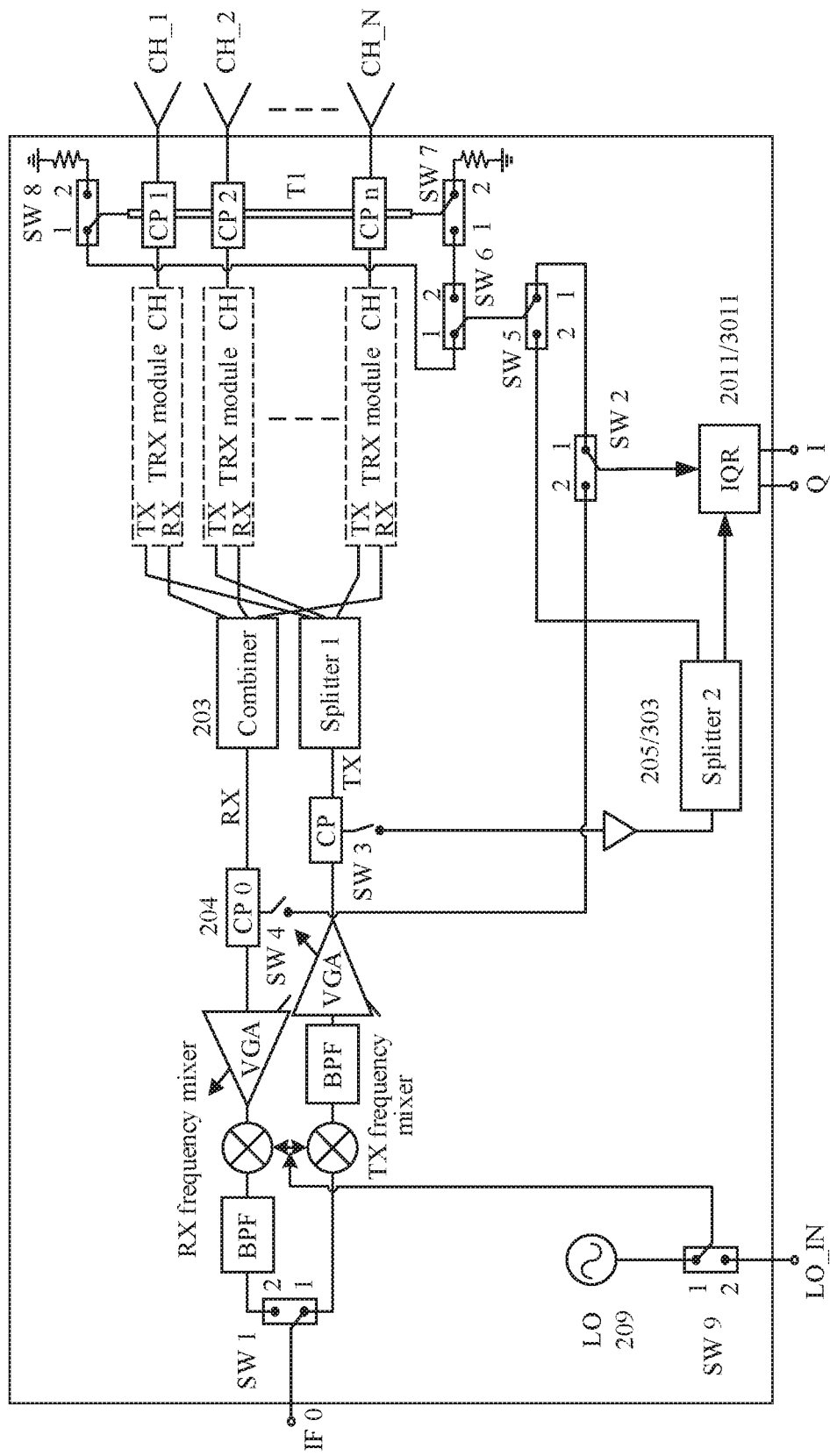
FIG. 15 is a schematic structural diagram of a twelfth apparatus according to an embodiment of this application.

For example, with reference to FIG. 13, when the apparatus for correcting the receive channels and the apparatus for correcting the transmit channels each are an apparatus into which an intermediate frequency signal is input, an integrated apparatus may be shown in FIG. 15. FIG. 15 includes a plurality of SWs (an SW 1 to an SW 9, where there are a plurality of SWs 1, and the plurality of SWs 1 include the SWs 1 in FIG. 13). IQR represents the quadrature receiver (that is, the quadrature receiver 2011 or 3011). CH_1 to CH_N represent the plurality of transmission channels. T1 represents the correction coupling channel. An example in which CH_1 is the first transmission channel, and CH_N is the second transmission channel is used. A CP 1 may represent the first endpoint. A CP n may represent the second endpoint. A TX frequency mixer is a frequency mixer of the transmit channels. An RX frequency mixer is a frequency mixer of the receive channels. I and Q may represent an I component and a Q component of a signal vector output by IQR. In FIG. 15, a VGA represents a variable gain amplifier. The switching unit 206 or the switching unit 304 may include the SW 6 to the SW 8. An IF 0 is an input end of an intermediate frequency signal.

When the SW 1, the SW 2, and the SW 5 are all located at positions 1, the SW 3 is closed, and the SW 4 is opened, the apparatus is configured to correct a deviation between the transmit channels. In addition, when the SW 6 to the SW 8 are all located at positions 1. IQR may receive a feedback signal output from the CP 1 in a coupling manner (that is, detect a feedback signal output from the first endpoint). When the SW 6 to the SW 8 are all located at positions 2. IQR may receive a feedback signal output from the CP n in a coupling manner (that is, detect a feedback signal output from the second endpoint). When the SW 9 is located at a position 1, an LO is configured to generate a correction signal, and the TX mixer inputs the first signal and the second signal to the transmit channels CH_1 and CH_N after processing the intermediate frequency signal and the correction signal. When the SW 9 is located at a position 2, a correction signal used by the TX mixer is from the outside.

When the SW 1, the SW 2, and the SW 5 are all located at positions 2, and the SW 3 and the SW 4 are both closed, the apparatus is configured to correct a deviation between the receive channels. In addition, when the SW 6 to the SW 8 are all located at the positions 1, the first signal is input from the CP 1 in a coupling manner (that is, fed from the first endpoint), and IQR may receive feedback signals of the receive channels CH_1 and CH_N that are output from a CP 0 in a coupling manner. When the SW 6 to the SW 8 are all located at the positions 2, IQR may receive feedback signals of the receive channels CH_1 and CH_N. When the SW 9 is located at the position 1, the LO is configured to generate a correction signal, and the RX frequency mixer inputs the first signal and the second signal after processing the intermediate frequency signal and the correction signal. When the SW 9 is located at the position 2, a correction signal used by the RX frequency mixer is from the outside.

Figure 16:
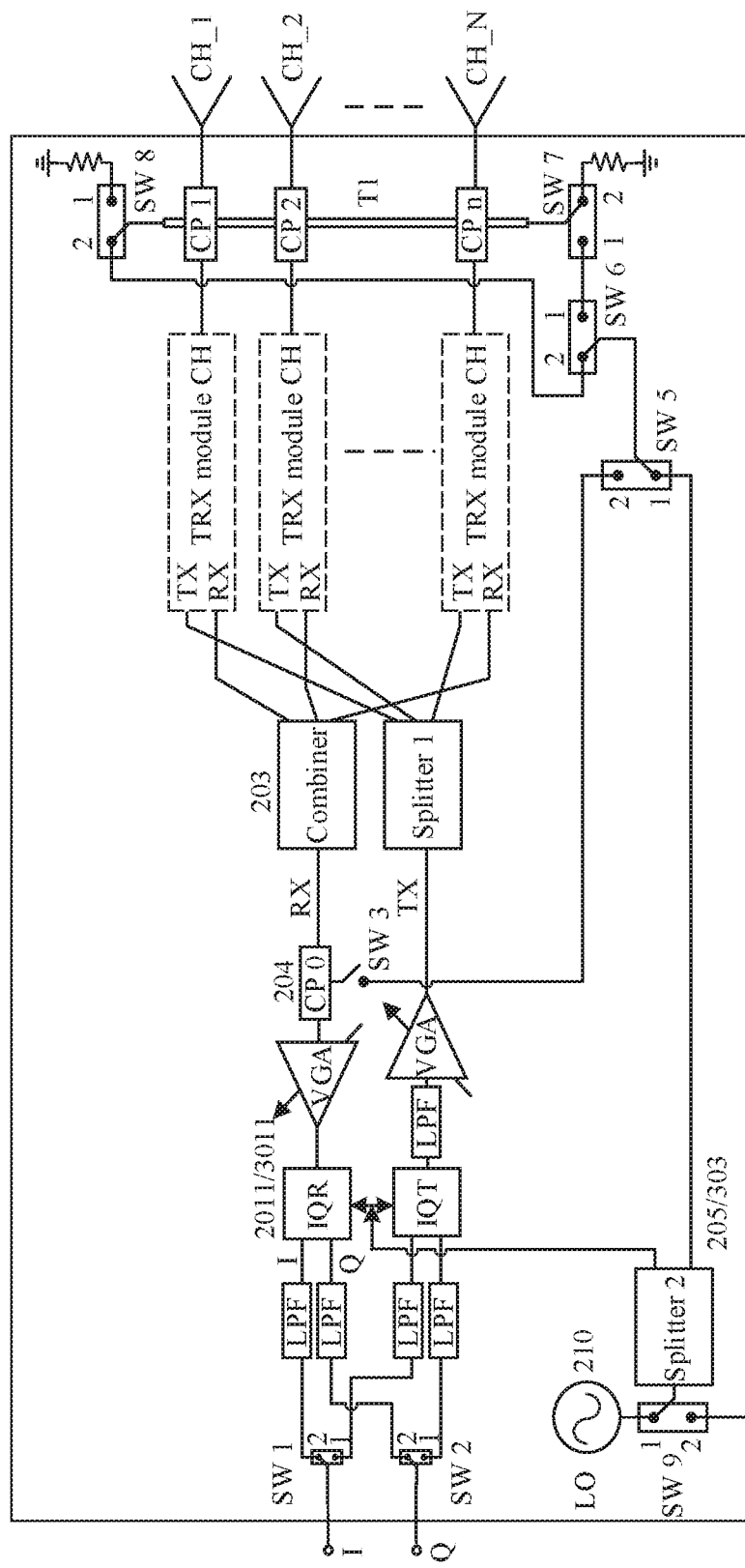
FIG. 16 is a schematic structural diagram of a thirteenth apparatus according to an embodiment of this application.

For example, with reference to FIG. 13, when the apparatus for correcting the receive channels and the apparatus for correcting the transmit channels each are an apparatus into which a baseband signal is input, an integrated apparatus may be shown in FIG. 16. FIG. 16 includes a plurality of SWs (an SW 1 to an SW 3 and an SW 5 to an SW 9, where there are a plurality of SWs 1, and the plurality of SWs 1 include the SWs 1 in FIG. 13). IQR represents the quadrature receiver. CH_1 to CH_N represent the plurality of transmission channels. T1 represents the correction coupling channel. An example in which CH_1 is the first transmission channel, and CH_N is the second transmission channel is used. A CP 1 may represent the first endpoint. A CP n may represent the second endpoint. In FIG. 16, an LPF represents a low pass filter (low pass filter, LPF). IQT represents an orthogonal transmitter. I and Q may represent an I component and a Q component of a signal vector output by IQR, or an I component and a Q component of a signal vector input to IQT. A VGA represents a variable gain amplifier. The LPF, IQT, and IQR may be original components in a baseband part. In this embodiment of this application, IQR in the baseband part may be reused when the deviation between the transmission channels is corrected. The switching unit 206 or the switching unit 304 may include the SW 6 to the SW 8.

When the SW 1, the SW 2, and the SW 5 are all located at positions 1, and the SW 3 is closed, the apparatus is configured to correct a deviation between the transmit channels. In addition, when the SW 6 to the SW 8 are all located at positions 1, IQR may receive a feedback signal output from the CP 1 in a coupling manner (that is, detect a feedback signal output from the first endpoint). When the SW 6 to the SW 8 are all located at positions 2, IQR may receive a feedback signal output from the CP n (that is, detect a feedback signal output from the second endpoint) in a coupling manner. When the SW 9 is located at a position 1, an LO is configured to input the first signal and the second signal. When the SW 9 is located at a position 2, the input first signal and second signal are from the outside.

When the SW 1, the SW 2, and the SW 5 are all located at positions 2, and the SW 3 is opened, the apparatus is configured to correct a deviation between the receive channels. In addition, when the SW 6 to the SW 8 are all located at the positions 1, the first signal is input from the CP 1 in a coupling manner (that is, fed from the first endpoint), and IQR may receive feedback signals of the receive channels CH_1 and CH_N. When the SW 6 to the SW 8 are all located at the positions 2, the second signal is input from the CP n in a coupling manner (that is, fed from the second endpoint), and IQR may receive feedback signals of the receive channels CH_1 and CH_N. When the SW 9 is located at the position 1, the LO is configured to generate the first signal and the second signal. When the SW 9 is located at the position 2, the first signal and the second signal are from the outside.

Figure 17:
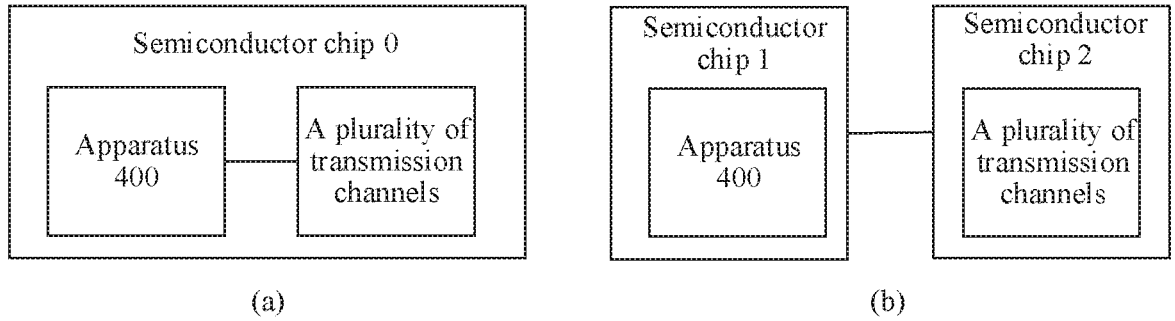
FIG. 17 is a schematic structural diagram of semiconductor chips according to an embodiment of this application.

Further, as shown in FIG. 17, an apparatus 400 (the apparatus 400 may be the separate apparatus 200 or apparatus 300, or may be an apparatus into which the apparatus 200 and the apparatus 300 are integrated) may be integrated into a semiconductor chip. The plurality of transmission channels may also be integrated into a semiconductor chip. The apparatus 400 and the plurality of transmission channels may be integrated into a same semiconductor chip, or may be integrated into different semiconductor chips. (a) in FIG. 17 is a schematic diagram in which the apparatus 400 and the plurality of transmission channels are integrated into a semiconductor chip 0. (b) in FIG. 17 is a schematic diagram in which the apparatus 400 is integrated into a semiconductor chip 1, and the plurality of transmission channels are integrated into a semiconductor chip 2.

Further, the apparatus 400 may be further integrated into a wireless communications device. For example, the wireless communications device may be a base station, or may be a terminal. When the wireless channel device is a base station, a semiconductor chip into which the plurality of to-be-corrected transmission channels are integrated may be located outside the wireless channel device. When the wireless channel device is a terminal, the apparatus 400 and the plurality of transmission channels may be both integrated into the terminal, and may be integrated into a same semiconductor chip, or may be integrated into different semiconductor chips.

Figure 18:
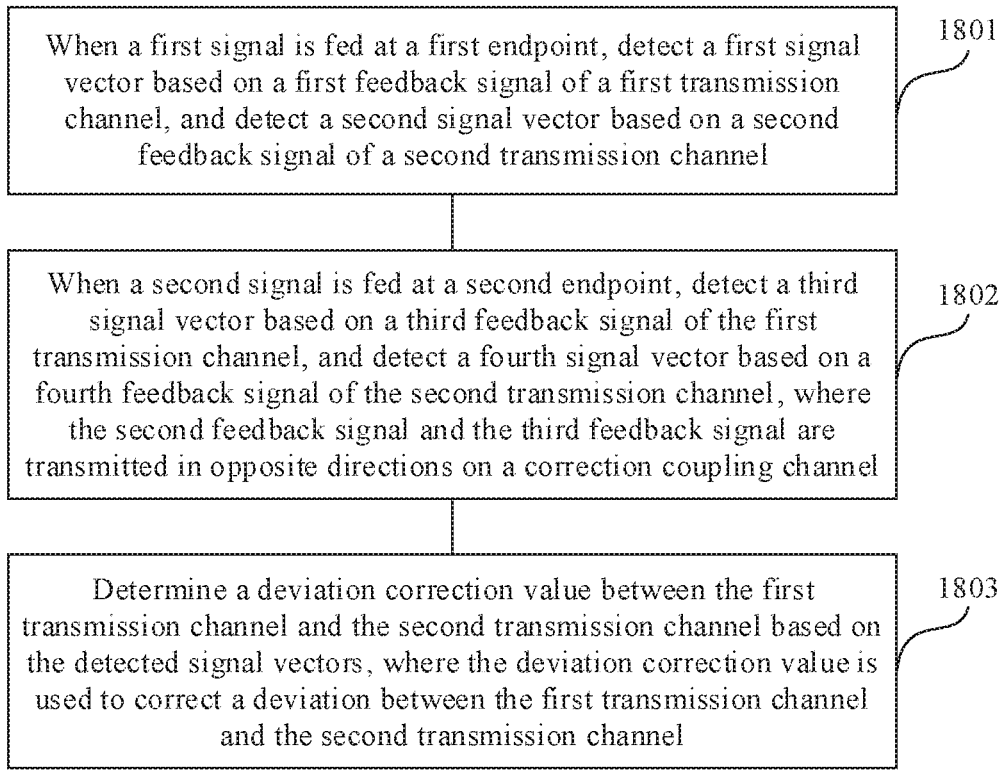
FIG. 18 is a schematic flowchart of a method for correcting a deviation between a plurality of transmission channels according to an embodiment of this application.

FIG. 18 is a schematic flowchart of a method for correcting a deviation between a plurality of transmission channels according to an embodiment of this application. The plurality of transmission channels include a first transmission channel, a second transmission channel, and a correction coupling channel. A first endpoint of the correction coupling channel is connected to the first transmission channel. A second endpoint of the correction coupling channel is connected to the second transmission channel. The method may be performed by the apparatus 200 provided in the foregoing embodiment, a chip integrating the apparatus 200, or a wireless communications device including the apparatus 200. Referring to FIG. 18, the method includes the following several steps.

Step 1801: When a first signal is fed at the first endpoint, detect a first signal vector based on a first feedback signal of the first transmission channel, and detect a second signal vector based on a second feedback signal of the second transmission channel.

Step 1802: When a second signal is fed at the second endpoint, detect a third signal vector based on a third feedback signal of the first transmission channel, and detect a fourth signal vector based on a fourth feedback signal of the second transmission channel, where the second feedback signal and the third feedback signal are propagated in opposite directions on the correction coupling channel.

Step 1803: Determine a deviation correction value between the first transmission channel and the second transmission channel based on the detected signal vectors, where the deviation correction value is used to correct a deviation between the first transmission channel and the second transmission channel.

It should be noted that for a specific implementation process of step 1801 to step 1803, refer to related descriptions of the vector detection unit 201 and the processing unit 202 in the apparatus embodiments provided in FIG. 2 to FIG. 5 and FIG. 7 to FIG. 9. Details are not described again in this embodiment of this application.

Further, when the plurality of transmission channels further include a third transmission channel, the method further includes: correcting a deviation between the first transmission channel and the third transmission channel, and/or correcting a deviation between the second transmission channel and the third transmission channel. A method for correcting the deviation between the first transmission channel and the third transmission channel and correcting the deviation between the second transmission channel and the third transmission channel is consistent with the foregoing method for correcting the deviation between the first transmission channel and the second transmission channel. Details are not described herein again in this embodiment of this application.

In this embodiment of this application, when the first transmission channel and the second transmission channel are receive channels, and the first signal is fed at the first endpoint and the second signal is fed at the second endpoint, the plurality of signal vectors are respectively detected based on the plurality of feedback signals of the first transmission channel and the second transmission channel. The second feedback signal and the third feedback signal are propagated in opposite directions between the first endpoint and the second endpoint of the correction coupling channel. Therefore, the deviation correction value between the first transmission channel and the second transmission channel may be determined based on the detected signal vectors of the feedback signals, so that transmission deviation values of the correction coupling channel are offset. Further, when correction is performed based on the deviation correction value, correction accuracy of the receive channels can be improved.

Figure 19:
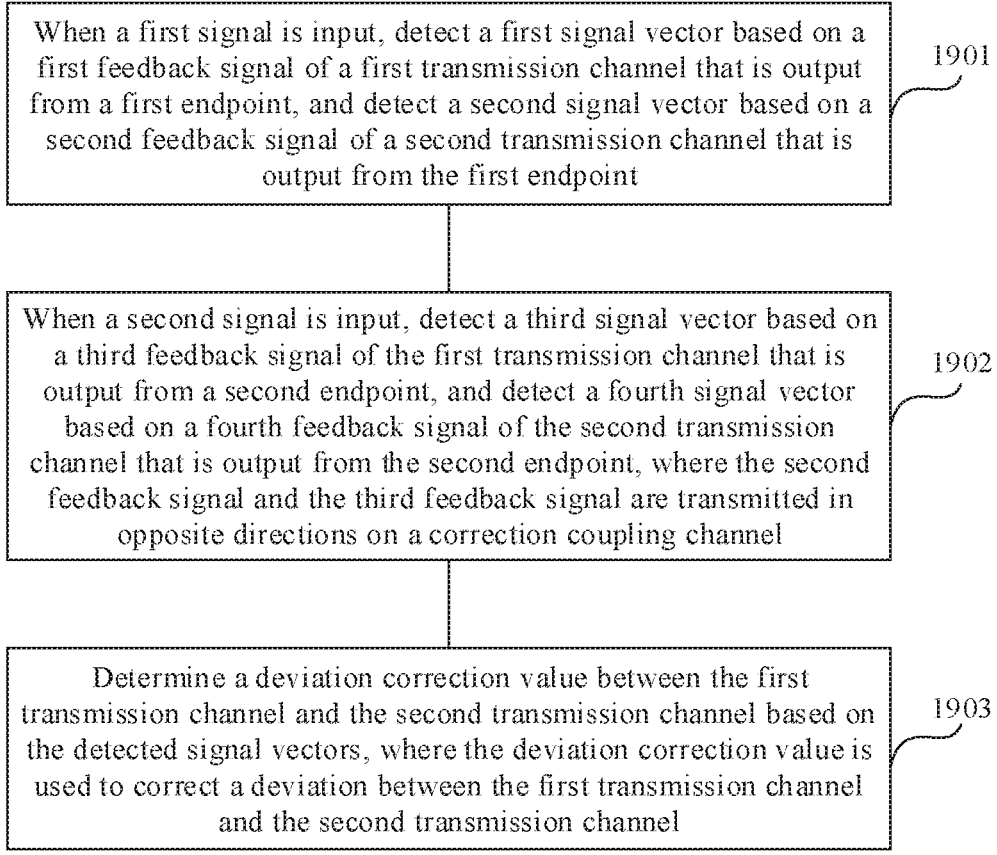
FIG. 19 is a schematic flowchart of another method for correcting a deviation between a plurality of transmission channels according to an embodiment of this application.

FIG. 19 is a schematic flowchart of a method for correcting a deviation between a plurality of transmission channels according to an embodiment of this application. The plurality of transmission channels include a first transmission channel, a second transmission channel, and a correction coupling channel. A first endpoint of the correction coupling channel is connected to the first transmission channel. A second endpoint of the correction coupling channel is connected to the second transmission channel. The method may be performed by the apparatus 300 provided in the foregoing embodiment, a chip integrating the apparatus 300, or a wireless communications device including the apparatus 300. Referring to FIG. 19, the method includes the following several steps.

Step 1901: When a first signal is input, detect a first signal vector based on a first feedback signal of the first transmission channel that is output from the first endpoint, and detect a second signal vector based on a second feedback signal of the second transmission channel that is output from the first endpoint.

Step 1902: When a second signal is input, detect a third signal vector based on a third feedback signal of the first transmission channel that is output from the second endpoint, and detect a fourth signal vector based on a fourth feedback signal of the second transmission channel that is output from the second endpoint, where the second feedback signal and the third feedback signal are propagated in opposite directions on the correction coupling channel.

Step 1903: Determine a deviation correction value between the first transmission channel and the second transmission channel based on the detected signal vectors, where the deviation correction value is used to correct a deviation between the first transmission channel and the second transmission channel.

It should be noted that for a specific implementation process of step 1901 to step 1903, refer to related descriptions of the vector detection unit 301 and the processing unit 302 in the apparatus embodiments provided in FIG. 10 to FIG. 12. Details are not described again in this embodiment of this application.

Further, when the plurality of transmission channels further include a third transmission channel, the method further includes: correcting a deviation between the first transmission channel and the third transmission channel, and/or correcting a deviation between the second transmission channel and the third transmission channel. A method for correcting the deviation between the first transmission channel and the third transmission channel and correcting the deviation between the second transmission channel and the third transmission channel is consistent with the foregoing method for correcting the deviation between the first transmission channel and the second transmission channel. Details are not described herein again in this embodiment of this application.

In this embodiment of this application, when the first transmission channel and the second transmission channel are transmit channels, and the first signal and the second signal are separately input, the plurality of signal vectors are respectively detected by using the feedback signals of the first transmission channel and the second transmission channel that are output from the first endpoint and the second endpoint. The second feedback signal and the third feedback signal are propagated in the opposite directions on the correction coupling channel. Therefore, the deviation correction value between the first transmission channel and the second transmission channel may be determined based on the plurality of detected signal vectors, so that the transmission deviation values of the correction coupling channel are offset, and further, when correction is performed based on the deviation correction value, correction accuracy of receive channels can be improved.

The foregoing descriptions are merely specific implementations of the present invention, but the protection scope of the present invention is not limited thereto. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An apparatus for correcting a deviation between a plurality of transmission channels, wherein the plurality of transmission channels comprise a first transmission channel, a second transmission channel, and a correction coupling channel, wherein a first endpoint of the correction coupling channel is connected to the first transmission channel, wherein a second endpoint of the correction coupling channel is connected to the second transmission channel, and wherein the apparatus comprises:
   a receiver, the receiver configured to:
      when a first signal is fed at the first endpoint, detect a first signal vector based on a first feedback signal of the first transmission channel, and detect a second signal vector based on a second feedback signal of the second transmission channel; and
      when a second signal is fed at the second endpoint, detect a third signal vector based on a third feedback signal of the first transmission channel, and detect a fourth signal vector based on a fourth feedback signal of the second transmission channel, wherein the second feedback signal and the third feedback signal are propagated in opposite directions on the correction coupling channel; and
   at least one processor, the at least one processor configured to determine a deviation correction value between the first transmission channel and the second transmission channel based on the detected signal vectors, wherein the deviation correction value is used to correct a deviation between the first transmission channel and the second transmission channel.

2. The apparatus according to claim 1, wherein the second feedback signal is a signal obtained after the first signal is propagated through the correction coupling channel from the first endpoint to the second endpoint and the second transmission channel, and wherein the third feedback signal is a signal obtained after the second signal is propagated through the first transmission channel and the correction coupling channel from the second endpoint to the first endpoint.

3. The apparatus according to claim 1, wherein the receiver comprises a quadrature receiver, wherein the first transmission channel and the second transmission channel are combined by using a combiner, and wherein the quadrature receiver is connected to the combiner by using a coupler;
   wherein, when the first signal is fed at the first endpoint, the quadrature receiver separately performs frequency mixing processing on the first signal and the first feedback signal and on the first signal and the second feedback signal to obtain the first signal vector and the second signal vector; and
   wherein, when the second signal is fed at the second endpoint, the quadrature receiver separately performs frequency mixing processing on the second signal and the third feedback signal and on the second signal and the fourth feedback signal to obtain the third signal vector and the fourth signal vector.

4. The apparatus according to claim 3, wherein the apparatus further comprises a splitter, wherein the splitter is connected to the quadrature receiver, wherein the splitter is further connected to the first endpoint and the second endpoint of the correction coupling channel by using a switch, and wherein:
   when the splitter is connected to the first endpoint by using the switch, the splitter is configured to split the first signal to the quadrature receiver and the first endpoint, and when the splitter is connected to the second endpoint by using the switch, the splitter is configured to split the second signal to the quadrature receiver and the second endpoint.

5. The apparatus according to claim 4, wherein the switch is a three-port switch or a three-port balun.

6. The apparatus according to claim 4, wherein the apparatus is an apparatus into which a radio frequency signal is input, wherein the first signal and the second signal are radio frequency signals, and wherein:
   the first signal and the second signal are radio frequency signals from outside the apparatus; or
   the apparatus further comprises a signal generator connected to the splitter, wherein the signal generator is configured to generate radio frequency signals, and wherein the radio frequency signals comprise the first signal and the second signal.

7. The apparatus according to claim 4, wherein the apparatus is an apparatus into which an intermediate frequency signal is input, wherein the apparatus further comprises a frequency mixer connected to the splitter, wherein the frequency mixer is configured to perform frequency mixing processing on the intermediate frequency signal and correction signals to obtain the first signal and the second signal, and wherein:
   the correction signals are from outside the apparatus; or
   the apparatus further comprises a signal generator, wherein the signal generator is configured to generate the correction signals.

8. The apparatus according to claim 4, wherein the apparatus is an apparatus into which a baseband signal is input, and wherein:
   the first signal and the second signal are from outside the apparatus; or
   the apparatus further comprises a signal generator connected to the splitter, wherein the signal generator is configured to generate the first signal and the second signal.

9. The apparatus according to claim 1, wherein the plurality of transmission channels further comprise a third transmission channel, wherein the third transmission channel is connected to a third endpoint of the correction coupling channel, and wherein the apparatus is further configured to at least one of:
   correct a deviation between the first transmission channel and the third transmission channel; or
   correct a deviation between the second transmission channel and the third transmission channel.

10. The apparatus according to claim 1, wherein the apparatus and the plurality of transmission channels are integrated into a same semiconductor chip.

11. A wireless communications device, comprising:
an apparatus and a plurality of transmission channels, wherein the plurality of transmission channels comprise a first transmission channel, a second transmission channel, and a correction coupling channel, wherein a first endpoint of the correction coupling channel is connected to the first transmission channel, wherein a second endpoint of the correction coupling channel is connected to the second transmission channel, and wherein the apparatus comprises:
a receiver, the receiver configured to:
when a first signal is fed at the first endpoint, detect a first signal vector based on a first feedback signal of the first transmission channel, and detect a second signal vector based on a second feedback signal of the second transmission channel; and
when a second signal is fed at the second endpoint, detect a third signal vector based on a third feedback signal of the first transmission channel, and detect a fourth signal vector based on a fourth feedback signal of the second transmission channel, wherein the second feedback signal and the third feedback signal are propagated in opposite directions on the correction coupling channel; and
at least one processor, the at least one processor configured to determine a deviation correction value between the first transmission channel and the second transmission channel based on the detected signal vectors, wherein the deviation correction value is used to correct a deviation between the first transmission channel and the second transmission channel.

12. A method for correcting a deviation between a plurality of transmission channels, wherein the plurality of transmission channels comprise a first transmission channel, a second transmission channel, and a correction coupling channel, wherein a first endpoint of the correction coupling channel is connected to the first transmission channel, wherein a second endpoint of the correction coupling channel is connected to the second transmission channel, and wherein the method comprises:
when a first signal is fed at the first endpoint, detecting a first signal vector based on a first feedback signal of the first transmission channel, and detecting a second signal vector based on a second feedback signal of the second transmission channel;
when a second signal is fed at the second endpoint, detecting a third signal vector based on a third feedback signal of the first transmission channel, and detecting a fourth signal vector based on a fourth feedback signal of the second transmission channel, wherein the second feedback signal and the third feedback signal are propagated in opposite directions on the correction coupling channel; and
determining a deviation correction value between the first transmission channel and the second transmission channel based on the detected signal vectors, wherein the deviation correction value is used to correct a deviation between the first transmission channel and the second transmission channel.

13. The method according to claim 12, wherein the second feedback signal is a signal obtained after the first signal is propagated through the correction coupling channel from the first endpoint to the second endpoint and the second transmission channel, and wherein the third feedback signal is a signal obtained after the second signal is propagated through the first transmission channel and the correction coupling channel from the second endpoint to the first endpoint.

14. The method according to claim 12, wherein:
the detecting a first signal vector and detecting a second signal vector comprises separately performing frequency mixing processing on the first signal and the first feedback signal and on the first signal and the second feedback signal to obtain the first signal vector and the second signal vector; and
the detecting a third signal vector and detecting a fourth signal vector comprises separately performing frequency mixing processing on the second signal and the third feedback signal and on the second signal and the fourth feedback signal to obtain the third signal vector and the fourth signal vector.

15. The method according to claim 12, wherein the plurality of transmission channels further comprise a third transmission channel, wherein the third transmission channel is connected to a third endpoint of the correction coupling channel, and wherein the method further comprises at least one of:
correcting a deviation between the first transmission channel and the third transmission channel; or
correcting a deviation between the second transmission channel and the third transmission channel.

* * * * *